US006085520A

United States Patent [19]
Kohno

[11] Patent Number: 6,085,520
[45] Date of Patent: Jul. 11, 2000

[54] SLIDE DRIVING DEVICE FOR PRESSES

[75] Inventor: Yasuyuki Kohno, Tokyo, Japan

[73] Assignee: Aida Engineering Co., Ltd., Japan

[21] Appl. No.: 08/972,813

[22] Filed: Nov. 18, 1997

[30] Foreign Application Priority Data

Apr. 21, 1997 [JP] Japan .................................... 9-103556

[51] Int. Cl.[7] ................................ F16D 31/02; B21J 9/18

[52] U.S. Cl. ................................ 60/414; 72/454; 60/418; 60/446; 60/448

[58] Field of Search .............................. 60/413, 414, 417, 60/418, 446, 448, 451, 487, 490, 485; 100/269.01, 269.14, 289; 72/454

[56] References Cited

U.S. PATENT DOCUMENTS

| | | | |
|---|---|---|---|
| 4,208,895 | 6/1980 | Grigorenko et al. | 100/289 X |
| 4,209,987 | 7/1980 | Kononov et al. | 60/413 |
| 4,215,543 | 8/1980 | Miller | 60/446 X |
| 4,563,889 | 1/1986 | Landwehr | 100/289 X |
| 5,460,084 | 10/1995 | Otremba et al. | 100/269.14 X |
| 5,499,525 | 3/1996 | Kordak et alk. | 100/259 X |
| 5,526,738 | 6/1996 | Logan | 100/269.14 X |
| 5,568,766 | 10/1996 | Otremba et al. | 100/239.14 X |
| 5,794,442 | 8/1998 | Lisniansky | 60/414 |

FOREIGN PATENT DOCUMENTS

| | | | |
|---|---|---|---|
| 4042186A1 | 7/1991 | Germany . | |
| 3123820 | 4/1992 | Germany | 60/446 |
| 01309797 | 12/1989 | Japan . | |
| 59092197 | 10/1994 | Japan . | |
| 08118096 | 5/1996 | Japan . | |
| 09174289 | 7/1997 | Japan . | |
| 1579788 | 7/1989 | Russian Federation | 100/289 |

*Primary Examiner*—John E. Ryznic
*Attorney, Agent, or Firm*—Morrison Law Firm

[57] ABSTRACT

A slide driving device employs a variable-displacement pump/motor for driving a rotating element of the slide driving device. The displacement volume of the variable-displacement pump/motor, whose output drives the slide, is varied in response to deviation of measured driver parameters from commanded driver parameters. An energy storage device temporarily absorbs excess energy during a portion of a molding cycle, and returns the energy to the system for re-use. In one embodiment, the energy storage device is an accumulator. In a second embodiment, the energy storage device is a flywheel. The combination of variable displacement volume and energy storage maintains the fluid pressure substantially constant during a cycle of the slide driving device.

20 Claims, 18 Drawing Sheets

FIG. 18A

| COMPARISON OF BASIC PRESS CHARACTERISTICS | 1. MECHANICAL LINK, CLAMP VALVE | 2. HYDRAULIC CYLINDER | 3. CONVENTIONAL MECHANICAL HYDRAULIC | 4. ELECTRIC SERVO MOTOR + SCREW | 5. THE DEVICE OF THE PRESENT INVENTION |
|---|---|---|---|---|---|
| A: ENERGY RELATED CATEGORIES | | | | | |
| A1: ENERGY EFFICIENCY EVALUATION OVERALL | ◎ | | | | |
| ENERGY EFFICIENCY A1a: DRIVE SOURCE | ◎ ID MOTOR FLY WHEEL | × ID MOTOR + PUMP VALVE | ID MOTOR + FLYWHEELS VARIABLE PUMP | AC SERVO MOTOR (ID MOTOR) | ID MOTOR + ACCUMULATOR VARIABLE MOTOR |
| ENERGY EFFICIENCY A1b: MECHANISM | ○ CRANK | CYLINDER | ○ CRANK | ○ SCREW | ○ SCREW * |
| A2: STORING ENERGY | ○ FLYWHEEL | ○ ACCUMULATOR | ○ FLYWHEEL | × NONE | ○ ACCUMULATOR |
| A3: MECHANISM FOR ENERGY CONSUMPTION | ○ FOR MODELS SENSITIVE TO LOAD<br>× FOR MODELS THAT CONSUME MORE ENERGY THAN NEEDED | | | | |
| A3a: SPEED UP/ SLOW DOWN LOAD | ○ | × | ○ | ○ | ○ |
| A3b: 2 WORK LOAD | ○ | × | ○ | ○ | ○ |
| A3c: TRUST PRESSURE LOAD | IMPOSSIBLE | ○ | ○ | × | ○ |
| A4: ENERGY LOSS FROM CONTROL TURNOVER | —— CAN NOT BE CONTROLLED | × ACCOMPANIED BY VISCOSITY LOSS DUE TO DRAWINGS OPERATION | ○ | ○ | ○ |
| A5: RETRIEVE OF ENERGY | | | | | |

| FIG.18A |
|---|
| FIG.18B |

FIG.18

FIG.18B

| B: CONTROL RELATED CATEGORIES | | | | | |
|---|---|---|---|---|---|
| OVERALL EVALUATION OF CONTROL | × × | ○ | △ | ○ | ○ |
| B1: RANGE OF OPERABLE FORCE | NONE | ○ | ○ COMPRESSION | × TAG OF OIL | ○ |
| B2: SYSTEM SPEED (RESPONSIVENESS) | NONE | ○ | △ | ○ | ○ |
| B3: DYNAMIC STABILITY (SMOOTH OPERATION) | NONE | ○ | ○ | ○ | ○ |
| B4: STATIC PRECISION | NONE (MECHANICAL) | ○ | △ OIL FLOW OIL COMPRESSION OF PUMP | ○ | ○ |
| B5: LINEARITY OF SLIDE FORCE | × CRANK LINK | ○ CYLINDER | × CRANK LINK | ○ SCREW | ○ SCREW |

* GENERAL COMPARISON IN NOT POSSIBLE SINCE VARIATION EXIST FOR USE OF SLIDING GUIDES ROLLING GUIDES, PACKING RESISTANCE, ETC.

| COMPARISON OF BASIC CHARACTERIZED | 1. MECHANIZED LINK, CLAMP DRIVE | 2. HYDRAULIC TAG FINDER | 3. CONVENTIONAL MECHANICAL HYDRAULIC DEVICE (FIG.20) | 4. ELECTRIC + SCREW | 5. DEVICE OF THE PRESENT INVENTION |
|---|---|---|---|---|---|
| C DOWN SIZING–RELATED CATEGORIES | | | | | |
| OVERALL DOWN SIZING EVALUATION | O | X | X | O | O |
| C1 STRAPLIFIZATION OF ELEMENTS | O | X | X | O | O |
| C2 APPLICABILITY OF HIGH–ENERGY MEDIUM | – | X | X | X | O |
| C3 CONSTRUCTION OF FEATURE SHARING DRIVE SOURCE | X | O | X | X | O |
| C4 ENERGY EFFICIENCY | O | X | O | O | O |
| C5 SHAPES FOR WHICH USE OF BENDING MOMENTS ARE DIFFICULT | SINCE FRAME STRUCTURES ARE USED A GENERAL COMPARISON CAN NOT BE MADE | | | | |

FIG.19

$$\frac{\frac{q^2gK}{2\pi VJ}}{S^2+\frac{GD}{J}S+\frac{q^2gK}{2\pi VJ}}$$

SLIDE DRIVING DEVICE FOR PRESSES

BACKGROUND OF THE INVENTION

The present invention relates to a slide driving device for presses. In particular, the present invention relates to a slide driving device for presses that convert energy from a hydraulic fluid into a drive force that is applied to a slide driving mechanism in a press.

Conventional slide driving devices for presses include mechanical devices in which energy is accumulated in a flywheel driven by an electric motor. This energy is transferred to a slide via a crank shaft thus providing efficient and high-cycle continuous operations. Alternatively hydraulic slide driving devices which use a hydraulic fluid to drive a slide can be used. Another type of slide driving device is the AC servo device. In this device a screw mechanism serves as a slide driving mechanism and this screw mechanism drives an AC servo motor. Each of these types of conventional slide driving devices for presses has advantages and disadvantages in the areas of energy efficiency, controllability, down-sizing, and the like.

Referring to FIG. 20 there has been developed a slide driving device for presses (Japanese Laid-Open Publication Number 1-309797) that drives a crank shaft using a hydraulic motor and a variable flow discharge pump. The object of this technology is to combine the high-cycle properties of the mechanical method described above with the ability to perform variable speed control provided by the hydraulic method described above.

Referring to FIG. 20 the slide drive device for presses includes a variable displacement pump 5 which receives a drive force from a motor 1 via a flywheel 2 a clutch brake 3 and a decelerator 4. A variable displacement motor 6 is rotated according to the flow discharged from variable displacement pump 5. Variable displacement motor 6, in turn, rotates a crank shaft 8 of a crank press 7. A control device 9, illustrated as a central processing unit (CPU), receives as inputs the rotation speed and the swash plate angle of variable displacement pump 5 and the rotation speed of crank shaft 8. An output of control device 9 controls the swash plate angle of variable displacement motor 6 and/or variable displacement pump in a manner to control the speed of a controlled slide to a pre-set slide speed.

Referring to FIG. 21(*a*) there is shown a schematic drawing of the slide driving device for presses. Referring to FIG. 21(*b*) there is shown a schematic block diagram of the device shown in FIG. 21(*a*) Referring to FIG. 21(*c*) there is shown a redrawn version of FIG. 21(*b*).

The following are the symbols used in the drawings and their meanings.

J: moment of inertia (kg $cm^2$)

q: displacement volume ($cm^3$/rad)

Q: oil flow ($cm^3$/s)

K: oil's bulk modulus of elasticity (kg/$cm^2$)

g: acceleration of gravity (cm/$s^2$)

s: Laplace operator (1/s: integral)

V: volume of pipe system ($cm^3$)

Ω: angular velocity (rad/s)

D: viscosity resistance coefficient (kg cm s/rad)

Referring to FIG. 21(*c*) in a static state oil flow Q can be expressed as $Q=\Omega^*q/(2\pi)$. Displacement velocity q is proportional to angular velocity Ω.

In a dynamic state the second-order lag expressed in the equation below takes place from the given oil flow Q until the required torque at the commanded angular velocity of the rotation of the hydraulic motor is generated:

$$\text{secondary lag}=\{\Omega a^2/(s^2+2xi\Omega a\ s+\Omega a^2)\}$$

$$\text{where } \Omega a^2=q^2gK/(2\pi V\ J)$$

$$xi=(D/Q)^*\{(\pi g\ V)/(2KJ)\}^{(1/2)}.$$

The conventional slide driving device for presses described above provides control of the oil flow for the hydraulic motor. The rotation speed of the hydraulic motor is determined by the oil flow supplied to the hydraulic motor. Thus a large amount of hydraulic fluid is required. The amount of hydraulic fluid is proportional to the product of the rotation speed and the displacement volume. As a result the oil-pressure generating device, the pipe capacity, and the like, must be large.

Also the torque required to drive the hydraulic motor is the product of the displacement volume and the pressure generated by compression of the hydraulic fluid in the pipe system. As described above, assuming ideal conditions, a secondary lag (90 degree phase delay in the natural frequency) is generated up to the point when the given oil flow results in a commanded angular velocity. In practice this characteristic is the dominant tendency. Thus a high degree of precision in control cannot be attained in system speed (responsiveness) and the like.

OBJECTS AND SUMMARY OF THE INVENTION

Accordingly, it is an object of the present invention to overcome the problems described above.

It is a further object of the present invention to provide a slide driving device for presses that greatly reduces the flow of the hydraulic fluid while allowing a high degree of control and providing good energy efficiency.

In order to achieve the objects described above the present invention comprises: means for generating fluid pressure in a hydraulic fluid with a pressure that is roughly constant or that has minor changes regardless of the changes in the load of the press; means for rotating receiving the hydraulic fluid from the fluid pressure generating means converting the energy from the hydraulic fluid into rotational power and applying the rotational power to the slide driving mechanism of the press wherein the displacement volume can be varied; means for controlling displacement volume controlling the drive torque applied to the slide driving device for the press by controlling the displacement volume of the rotation means.

The fluid pressure generating means need only generate a pressure that is roughly constant or that has only minor variations regardless of changes in load in the press. There is no need to circulate a large amount of hydraulic fluid. In the conventional methods described above the fluid volume is fixed and the fluid pressure is changed to provide equilibrium with the load. With the method of the present invention however the fluid pressure stays fixed and the minimum required fluid volume (the displacement volume) is used. Thus the device can be made more compact. Drive torque is proportional to the displacement volume and the hydraulic fluid applied to the rotating means from the fluid pressure generating means. Thus the lag between the determination of the displacement volume and the generation of torque is either eliminated or it is, at most, negligible. As a result, the responsiveness of the system for producing a commanded angular velocity is roughly a first-order lag thus providing a higher degree of control compared to the conventional technology.

The rotating means of the present invention converts the rotation energy transferred from the slide of the press via the slide driving mechanism into energy for the hydraulic fluid. This converted hydraulic fluid energy can be recovered by an accumulator which serves as the fluid-pressure generating means and stored by the flywheel via the variable displacement pump/motor. Since large amounts of hydraulic fluid are not required, viscosity loss is low and energy efficiency is high.

Since the energy output is stored temporarily in the accumulator or the flywheel, distributed consumption of the energy is possible during a cycle. This feature is very useful in presses which experience drastic changes in molding load.

Alternatively the present invention comprises: a single means for generating fluid pressure generating hydraulic fluid with a pressure that is roughly constant or that has minor changes regardless of the changes in the load of either a plurality of presses or a press having a plurality of slides; a plurality of means for rotating receiving the hydraulic fluid from the fluid pressure generating means converting the energy from the hydraulic fluid into rotational power and applying the rotational power to the corresponding slide drive mechanisms wherein the displacement volumes can be varied; means for controlling displacement volume controlling the drive torque applied to the slide driving devices by controlling the displacement volumes of the plurality of rotating means.

With this configuration a single fluid pressure generating means can be shared by a plurality of presses.

Briefly stated, the present invention provides a slide driving device that employs a variable-displacement pump/motor for driving a rotating element of the slide driving device. The displacement volume of the variable-displacement pump/motor, whose output drives the slide, is varied in response to deviation of measured driver parameters from commanded driver parameters. An energy storage device temporarily absorbs excess energy during a portion of a molding cycle, and returns the energy to the system for re-use. In one embodiment, the energy storage device is an accumulator. In a second embodiment, the energy storage device is a flywheel. The combination of displacement volume and energy storage maintains the fluid pressure substantially constant during a cycle of the slide driver.

According to an embodiment of the invention, there is provided a slide driving device for a press comprising: means for generating pressure in a hydraulic fluid, the pressure being substantially constant during changes in the load on the press, rotating means, responsive to the pressure, for converting energy from the hydraulic fluid into rotational power, means for applying the rotational power to a slide driving mechanism of the press, means for varying a displacement volume of the rotating means, and means for controlling the displacement volume, thereby controlling a drive torque applied to the slide driving mechanism.

According to a feature of the invention, there is provided a slide driving device for a press comprising: a single means for generating fluid pressure generating hydraulic fluid with a pressure that has no more than minor changes regardless of the changes in the load on at least one press having a plurality of slides, a plurality of means for rotating receiving the hydraulic fluid from the means for generating fluid pressure, the means for rotating including means for converting energy from the hydraulic fluid into rotational power and for applying the rotational power to a driving mechanism of the press wherein displacement volumes of the plurality of rotating means can be varied, and means for controlling displacement volumes to control drive torque applied to each of the slide driving device by controlling the displacement volume of the plurality of rotating means.

According to a further feature of the invention, there is provided a slide driving device for driving a slide of a press, comprising: a variable displacement pump/motor, the variable displacement pump/motor producing a pressured fluid, rotating means for driving the slide in response to the pressurized fluid, means for controlling a displacement volume of the variable displacement pump/motor in response to a deviation of a measured parameter of the slide driving device from at least one target parameter, whereby actuation of the slide is forced to conform generally to the at least one target parameter, and means for storing, temporarily, excess energy during a portion of a molding cycle.

The above and other objects features and advantages of the present invention will become apparent from the following description read in conjunction with the accompanying drawings in which like reference numerals designate the same elements.

BRIEF DESCRIPTION OF THE DRAWINGS

FIG. 18 is a table comparing the characteristics of the device of the present invention and conventional devices.

FIG. 19 is a table comparing the characteristics of the device of the present invention and conventional devices.

FIG. 21(*b*) is an idealized block diagram of the device shown in FIG. 21(*a*).

FIG. 21(*c*) is an alternative rendering of FIG. 21(*b*).

DETAILED DESCRIPTION OF THE PREFERRED EMBODIMENTS

Figure 1A:
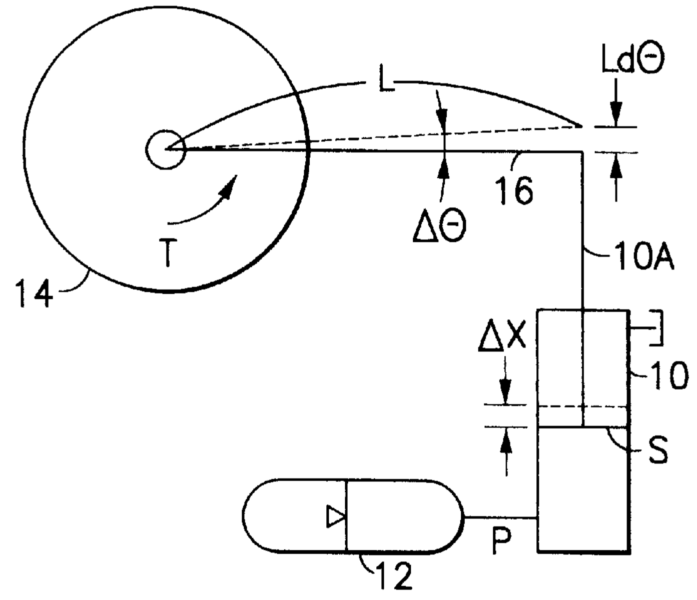
FIGS. 1(*a*)–1(*c*) are drawings illustrating the principles behind the slide driving device for presses of the present invention.
Figure 1B:
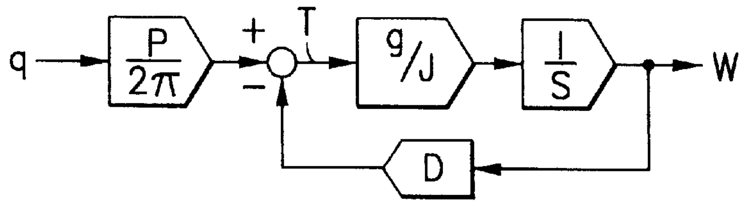
Figure 1C:
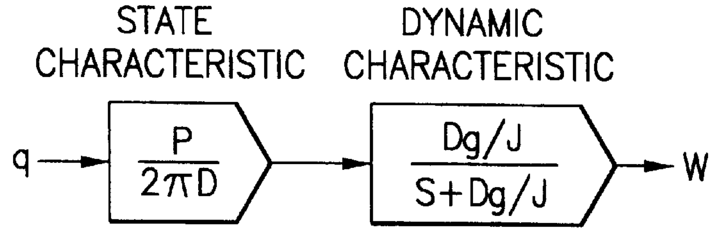

Referring to FIG. 1(*a*) drive torque T of a drive shaft 14 can be expressed as:

$$T = PxSxL \quad (1)$$

where:

S is the cross-section area of a cylinder 10

P (constant) is the pressure of the hydraulic oil sent to cylinder 10 from an accumulator 12

L is the length of an arm 16 between a piston rod 10A and drive shaft 14.

It is assumed that there are a plurality of cylinders 10 having different cross-sectional areas. As equation (1) makes clear, drive torque T is proportional to the cross-section area S of cylinder 10.

Also:

$$\Delta x = Lx\Delta\Theta$$

where $\Delta x$ is a very small displacement of cylinder 10 and $\Delta\Theta$ is the very small change in the angle of drive shaft 14 caused by the rotation resulting from $\Delta x$.

By substituting this equation into equation into (1) equation (1) can be rewritten as follows:

$$T = PxSx(\Delta x/\Delta\Theta) = Px(\Delta V/\Delta\Theta) \quad (2)$$

where $\Delta V = Sx\Delta x$.

In equation (2) if the cylinder is redesigned and cross-section area S is changed, $\Delta V$ also changes.

Since $(\Delta V/\Delta\Theta)$ expresses the volume (i.e. displacement volume q) corresponding to a very small change in angle, equation (2) can be expressed as follows:

$$T = Pxq \quad (3)$$

In other words drive torque T is proportional to displacement volume q based on a roughly constant hydraulic oil pressure P. This schematic drawing illustrates an example involving a very small section of a stroke of cylinder 10 but the principles remain valid in cases where variable displacement pumps/motors or the like are used.

Referring to FIG. 1(*b*) there is shown an idealized block diagram of FIG. 1(*a*) for a very small angle $\Delta\Theta$. FIG. 1(*c*) is an alternative rendering of FIG. 1(*b*).

The following are the symbols used in the drawings and their meanings.

J: moment of inertia (kg $cm^2$)

q: displacement volume ($cm^3$/rad)

g: acceleration of gravity (cm/$s^2$)

s: Laplace operator (1/s: integral)

$\Omega$: angular velocity (rad/s)

D: viscosity resistance coefficient (kg cm s/rad)

P: pressure of hydraulic oil (kg/$cm^2$)

Referring to FIG. 1(*c*), in a static state, displacement volume q is expressed in the following the equation:

$$q = \Omega(2\pi D/P) \quad (4)$$

By substituting $Q = \Omega q/(2\pi)$ into (4) for oil flow Q:

$$Q = \Omega^2(D/P) \quad (5)$$

Thus Q is proportional to the viscosity resistance coefficient D (the value will be very small if the load is small).

In the dynamic state the first-order lag for displacement volume q to generate angular velocity $\Omega$ can be expressed as:

first-order lag$=\Omega a/(s+\Omega a)$ where $\Omega a = Dg/J$.

Thus with the present invention, the responsiveness for generating angular velocity $\Omega$ from displacement volume q involves a first-order lag (a 45-degree phase delay for natural frequency $\Omega a$).

This responsiveness is due to the lack of oil compression. Thus the phase delay is less than that of the conventional device shown in FIG. 20. Also various compensations related to control are easier to perform (a high gain can be provided during feedback when the phase delay is small), start up is faster, and a higher degree of control can be achieved.

Figure 2:
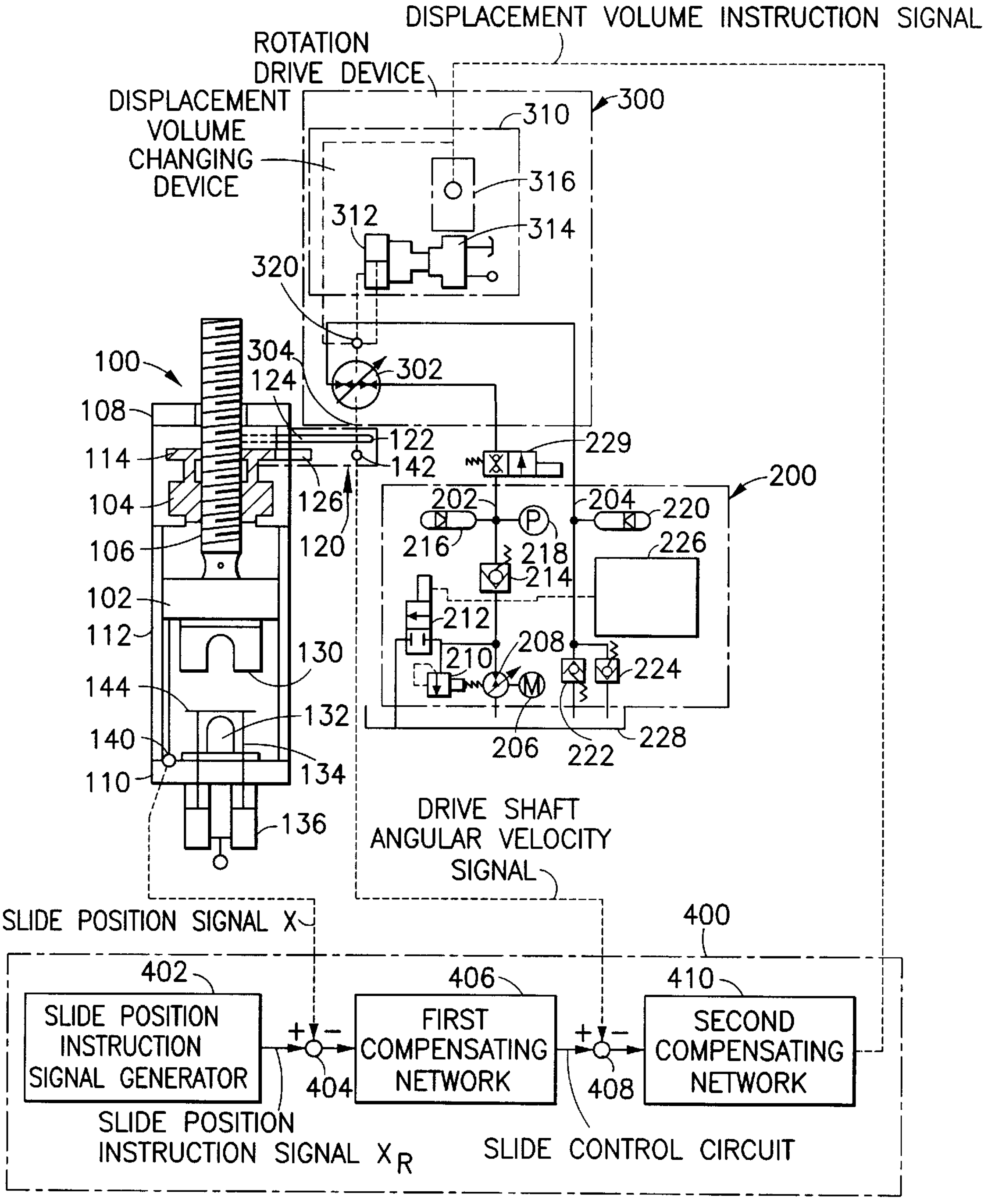
FIG. 2 is a schematic diagram showing a first embodiment of the slide control device for presses of the present invention.
Figure 2A:
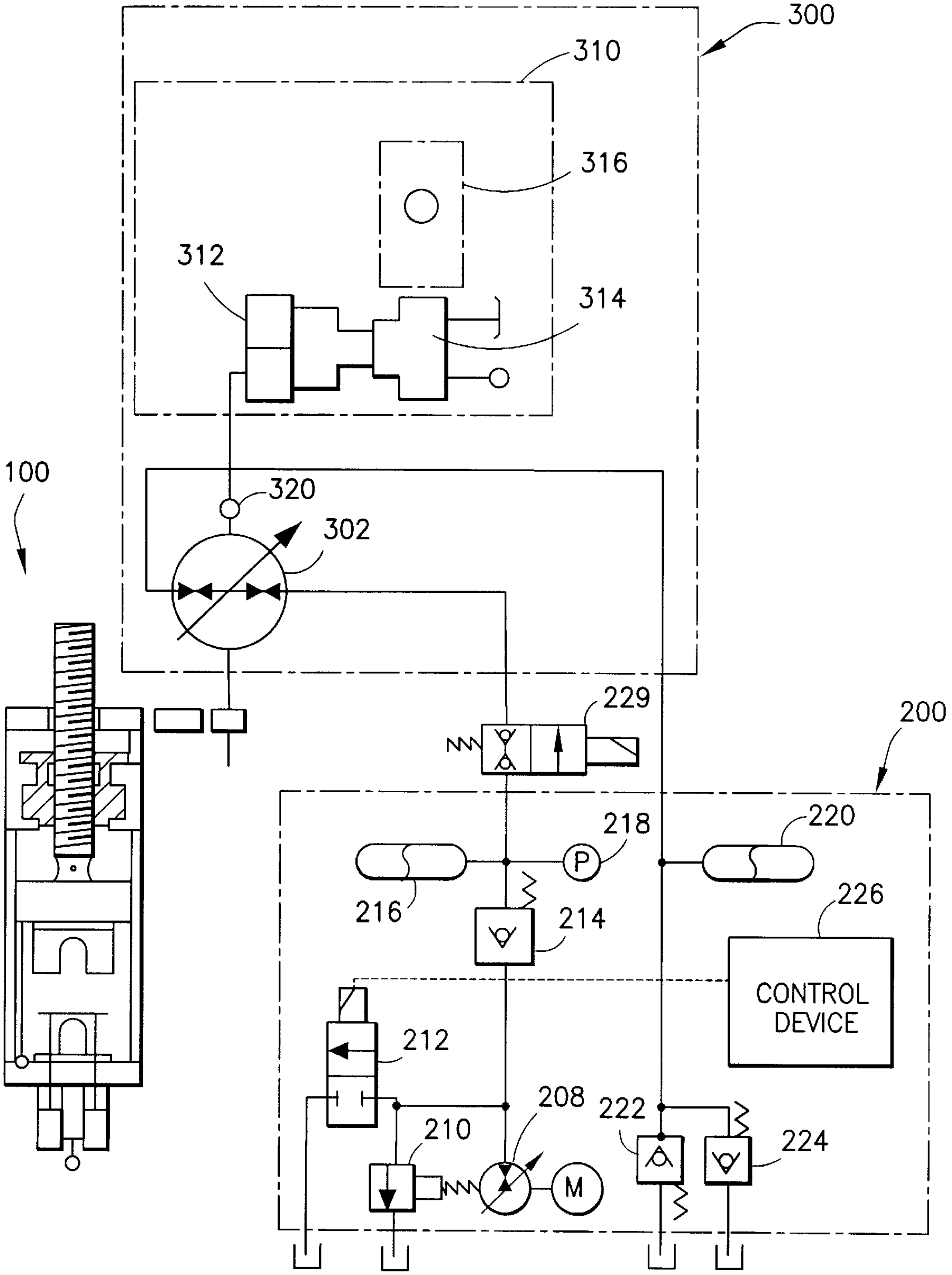
FIG. 2A is a simplified schematic diagram of the slide control device shown in FIG. 2.

Referring to FIGS. 2 and 2A there is shown a first embodiment of the slide driving device for presses of the present invention. Referring to the drawing this slide driving device drives a slide 102 of a screw press 100. The slide driving device essentially includes an oil pressure generating device 200 a rotation drive device 300 and a slide control circuit 400.

Screw press 100 comprises a screw mechanism to serve as the drive mechanism for slide 102. The screw mechanism comprises a drive nut 104 and a driven screw 106. Drive nut 104 is rotatably supported by a crown 108. A column 112 connects crown 108 to a bed 110. Slide 102 is disposed at the lower end of driven screw 106.

A ring gear 114 is disposed integrally with drive nut 104. Rotational drive force is transferred to ring gear 114 through a reduction gear mechanism 120 and a drive shaft 304 of a variable displacement pump/motor 302 which is part of rotation drive device 300

Reduction gear mechanism 120 includes a small gear 122 which is rotated by drive shaft 304. A large gear 124 is meshed with small gear 122. Large gear 124 is coaxially connected to a small gear 126. Small gear 126 is meshed with ring gear 114. Reduction gear mechanism 120 is illustrated using a single stage of reduction but the present invention does not impose restrictions on the reduction method or the number stages employed to obtain the desired reduction.

An upper die 130 faces a lower die 132 in column 112. A die cushion 134 is disposed about lower die 132. Die cushion 134 is connected to a die cushion cylinder 136 located below bed 110.

A slide position detector 140 and a drive shaft angular velocity detector 142 are disposed on screw press 100. Slide position detector 140 is a conventional device such as for example, a Magnescale™ that detects the position of slide 102 by measuring the distance between slide 102 and bed 110. A slide position signal indicating the position of slide 102 is sent to slide control circuit 400. Slide position detector 140 could also determine the position of slide 102 by measuring the distance between slide 102 and crown 108. Furthermore slide position detector 140 is not restricted to a Magnescale and can comprise other kinds of sensors such as encoders and potentiometers.

Drive shaft angular velocity detector 142 detects the angular velocity of variable displacement pump/motor 302 of variable displacement pump/motor 302. A drive shaft angular velocity signal indicating the angular velocity of drive shaft 304 is sent to slide control circuit 400.

Drive shaft angular velocity detector 142 may be, for example, an incremental or absolute rotary encoder or tachogenerator.

Oil pressure generating device 200 includes a high-pressure pipe 202 connected to an inlet of variable displacement pump/motor 302, and a low-pressure pipe 204 connected to an outlet of variable displacement pump/motor 302. High-pressure pipe 202 receives a flow of pressurized fluid through a pilot operated check valve 214 from a fixed-capacity hydraulic pump 208. An electric motor 206 drives variable displacement pump/motor 302. The output of fixed-capacity hydraulic pump 208 is connected to inputs of two-port two-position electromagnetic selector valve 212 and high-pressure relief valve 210. An accumulator 216 and a pressure gauge 218 are connected to high-pressure pipe 202 downstream of pilot operated check valve 214. Low-pressure pipe 204 is connected to an accumulator 220; and spring check valves 222 and 224. Oil pressure generating device 200 contains a pressure control device 226 which produces an output controlling two-port two-position electromagnetic selector valve 212 and pilot operated check valve 214.

When high-pressure relief valve 210 and two-port two-position electromagnetic selector valve 212 are closed, pressurized oil from hydraulic pump 208 flows through pilot operated check valve 214 and high-pressure pipe 202 to the high-pressure inlet of variable displacement pump/motor 302. The pressure in high-pressure pipe 202 is also connected to accumulator 216.

Pressure control device 226 controls two-port two-position electromagnetic selector valve 212 and pilot operated check valve 214 to maintain the pressure at accumulator 216 (the pressure on the high-pressure side) to a predetermined value of, for example, 180 (kg/cm$^2$)–260 (kg/cm$^2$). When the pressure detected by pressure gauge 218 at accumulator 216 reaches 260 (kg/cm$^2$), pressure control device 226 opens two-port two-position electromagnetic selector valve 212. This causes the pressurized oil from hydraulic pump 208 to return to an oil tank 228 at low pressure. As a result hydraulic pump 208 is operated with no load. Pilot operated check valve 214 prevents the circuit pressure on the high-pressure side from dropping when hydraulic pump 208 is running with no load. Also when the pressure at accumulator 216 exceeds 260 (kg/cm$^2$) pilot operated check valve 214 is opened by pressure control device 226.

If fixed-capacity hydraulic pump 208 is running with no load, pressure control device 226 closes two-port two-position electromagnetic selector valve 212 until the pressure at accumulator 216 detected by pressure gauge 218 reaches 180 (kg/cm$^2$). This causes the pressurized oil from hydraulic pump 208 to flow via pilot operated check valve 214 into high-pressure pipe 202 and accumulator 216 which are connected to variable displacement pump/motor 302. This results in an increase in the circuit pressure on the high-pressure side of variable displacement pump/motor 302.

A cut-off valve 229 is disposed in high-pressure pipe 202 between accumulator 216 and variable displacement pump/motor 302. Cut-off valve 229 is operated to cut off the oil pressure supply from variable displacement pump/motor 302 of rotation drive device 300 when screw press 100 is not being used. Spring check valve 222 keeps the pressure at accumulator 220 (the circuit pressure on the low-pressure side of variable displacement pump/motor 302) which is connected to low-pressure pipe 204 at a predetermined maximum pressure of, for example, 5 (kg/cm$^2$).

Spring check valve 224 permits suction into low pressure pipe 204 when variable displacement pump/motor 302 is operated as a pump.

Oil pressure generating device 200 as described above uses a fixed-capacity hydraulic pump 208 but the present invention is not restricted to this. A variable displacement pump can also be used without departing from the spirit and scope of the invention. In this case the pressure at accumulator 220 can be kept roughly constant by controlling the tilt of the swash plate of the variable displacement pump.

Variable displacement pump/motor 302 can either provides oil pressure to, or receives oil pressure from, oil pressure generating device 200. Variable displacement pump/motor 302 is preferably a dual-tilt swash plate, or swash-shaft axial piston pump/motor for which the oil-pressure flow (displacement volume) necessary to rotate drive shaft 304 for one rotation can be varied. By changing the tilt of the swash plate or the swash shaft, the direction and the displacement volume of the dual-tilt axial piston pumps/motors can be changed. A displacement volume varying device 310 controls the swash plate or swash shaft angle of variable displacement pump/motor 302 in response to a displacement volume detected by a displacement volume detector 320. Alternatively, the variable displacement pump may be a variable displacement radial piston pump.

Displacement volume varying device 310 includes a hydraulic cylinder 312 for changing the swash-plate tilt of variable displacement pump/motor 302. A servo valve 314 controls the oil flow sent to hydraulic cylinder 312. An operational amplifier 316 provides an electrical drive signal to servo valve 314. Displacement volume detector 320 detects the swash-plate tilt (i.e. the displacement volume) of variable displacement pump/motor 302 by determining the position of the piston rod in hydraulic cylinder 312.

Slide control circuit 400 provides a displacement volume instruction signal to the positive input of operational amplifier 316 to control the displacement volume of variable displacement pump/motor 302. A displacement volume detection signal is sent from displacement volume detector 320 to the negative input of operational amplifier 316 in order to indicate the current displacement volume of variable displacement pump/motor 302. Operational amplifier 316 calculates the difference between the two input signals. The difference or error signal is amplified and sent as a drive signal to servo valve 314. This causes servo valve 314 to adjust the oil flow to hydraulic cylinder 312 corresponding to the received drive signal. Servo valve 314 is controlled so it controls the swash-plate tilt of variable displacement pump/motor 302 to make the displacement volume of variable displacement pump/motor 302 equal to the displacement volume commanded by the displacement volume instruction signal.

Drive shaft 304 of variable displacement pump/motor 302 in rotation drive device 300 receives a drive torque, which as explained above in equation (3), that is proportional to the product of pressure P of the hydraulic oil from oil pressure generating device 200 and the displacement volume q of variable displacement pump/motor 302.

Since pressure P from the hydraulic oil is roughly constant, drive torque T applied to drive shaft 304 is proportional to displacement volume q of variable displacement pump/motor 302.

The drive torque and rotation of drive shaft 304 of variable displacement pump/motor 302 is transferred through reduction gear mechanism 120 and ring gear 114 to drive nut 104 of screw press 100 thus rotating drive nut 104. This rotation of drive nut 104 causes driven screw 106 and slide 102 to move up and down.

Slide control circuit 400 outputs the displacement volume instruction signal to control the displacement volume of variable displacement pump/motor 302 of rotation drive device 300. Slide control circuit 400 includes a slide position instruction signal generator 402 which applies a slide position command or instruction signal Xr to a +input of an adder 404. The –input of adder 404 receives the slide position signal from slide position detector 140. The difference, or error signal from adder 404 is applied to a first compensating network 406, whose structure and function is described below. The output of first compensating network 406 is applied to a first input of an adder 404. The drive shaft angular velocity signal from drive shaft angular velocity detector 142 is applied to the –input of adder 404. The difference, or error, signal from adder 408 is applied to the input of a second compensating network 410, whose structure and function is described below. The output of second compensating network 410 is the displacement volume instruction or command signal applied to the +input of operational amplifier 316 in displacement volume varying device 310.

Figure 3:
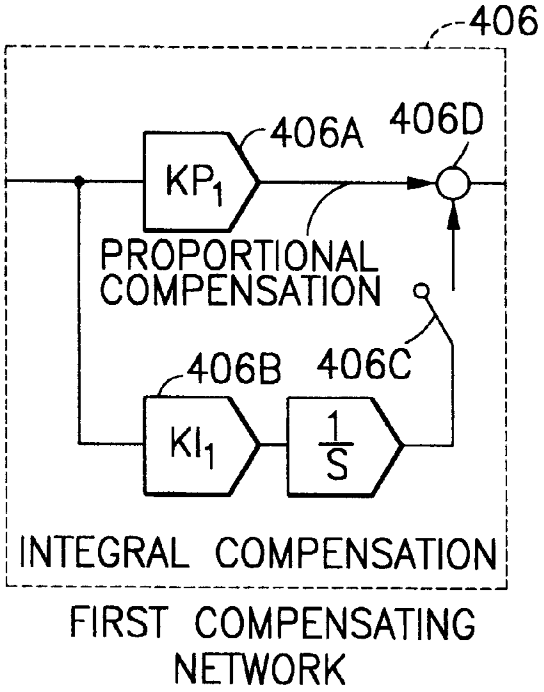
FIG. 3 is a drawing showing the first compensating network of the slide control circuit in FIG. 2.

Referring momentarily to FIG. 3, first compensating network 406 a proportional compensating network 406A in parallel with an integral compensating network 406B. A switch 406C controls whether or not integral compensating network 406B is effective, depending on the slide position. An adder 406D receives the output of proportional compensating network at one of its two +inputs, and the output of switch 406C at the other of its two +inputs. When switch 406C is closed, adder 406D sums the contributions of the two compensating networks.

Returning to FIG. 2, the difference signal from adder 404 is converted into a control-amount signal in first compensating network 406, as described above. The control-amount signal is a commanded driveshaft angular velocity. The output of first compensating network 406 and is applied to the positive input of adder 408. A drive shaft angular velocity signal, indicating the current angular velocity of drive shaft 304, is connected from drive shaft angular velocity detector 142 to the negative input of adder 408. Adder 408 determines the difference between the two input signals and the resulting difference or driveshaft angular velocity error signal is sent to second compensating network 410.

Figure 4:
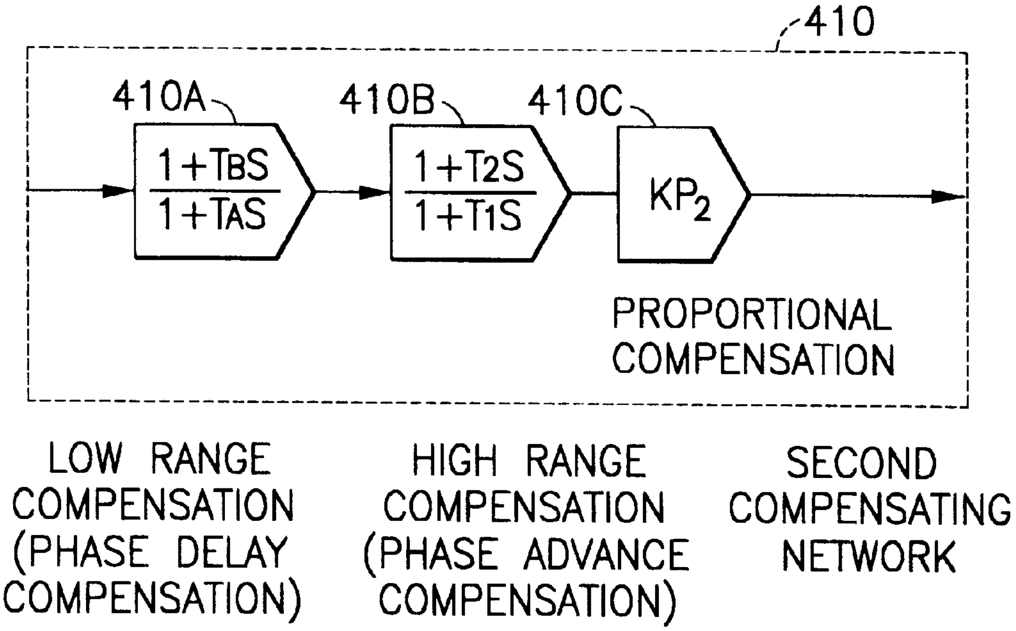
FIG. 4 is a drawing showing the second compensating network of the slide control circuit in FIG. 2.

Referring now to FIG. 4, second compensating network 410 comprises a low-range compensating circuit 410A a high-range compensating network 401B and a proportional compensating network 410C connected in series in the order listed. Second compensating network 410 serves to provide quicker response for the control system and to improve the precision of control operations by reducing steady-state deviation.

The particular compensating networks shown in FIG. 3 and FIG. 4 are merely for illustration of an embodiment of the invention. Other compensating networks may be used without departing from the spirit and scope of the invention. the compensating network shown in the drawing is just one example that can be used.

Returning again to FIG. 2, the difference signal from adder 408 is converted by second compensating network 410 into a displacement volume instruction signal indicating the target displacement volume of variable displacement pump/motor 302. The displacement volume instruction signal is then sent to the positive input of operational amplifier 316 of displacement volume varying device 310.

By controlling the displacement volume of variable displacement pump/motor 302 as described above, the drive torque applied to drive shaft 304 is controlled. The drive torque and rotation of drive shaft 304 is transferred via reduction gear mechanism 120 and ring gear 114 to drive nut 104 of screw press 100 thus rotating drive nut 104 and moving slide 102 up and down.

In this example the load on screw press 100 is imposed by a countering force produced by die cushion cylinder 136 to draw a molding material 144.

Figure 5:
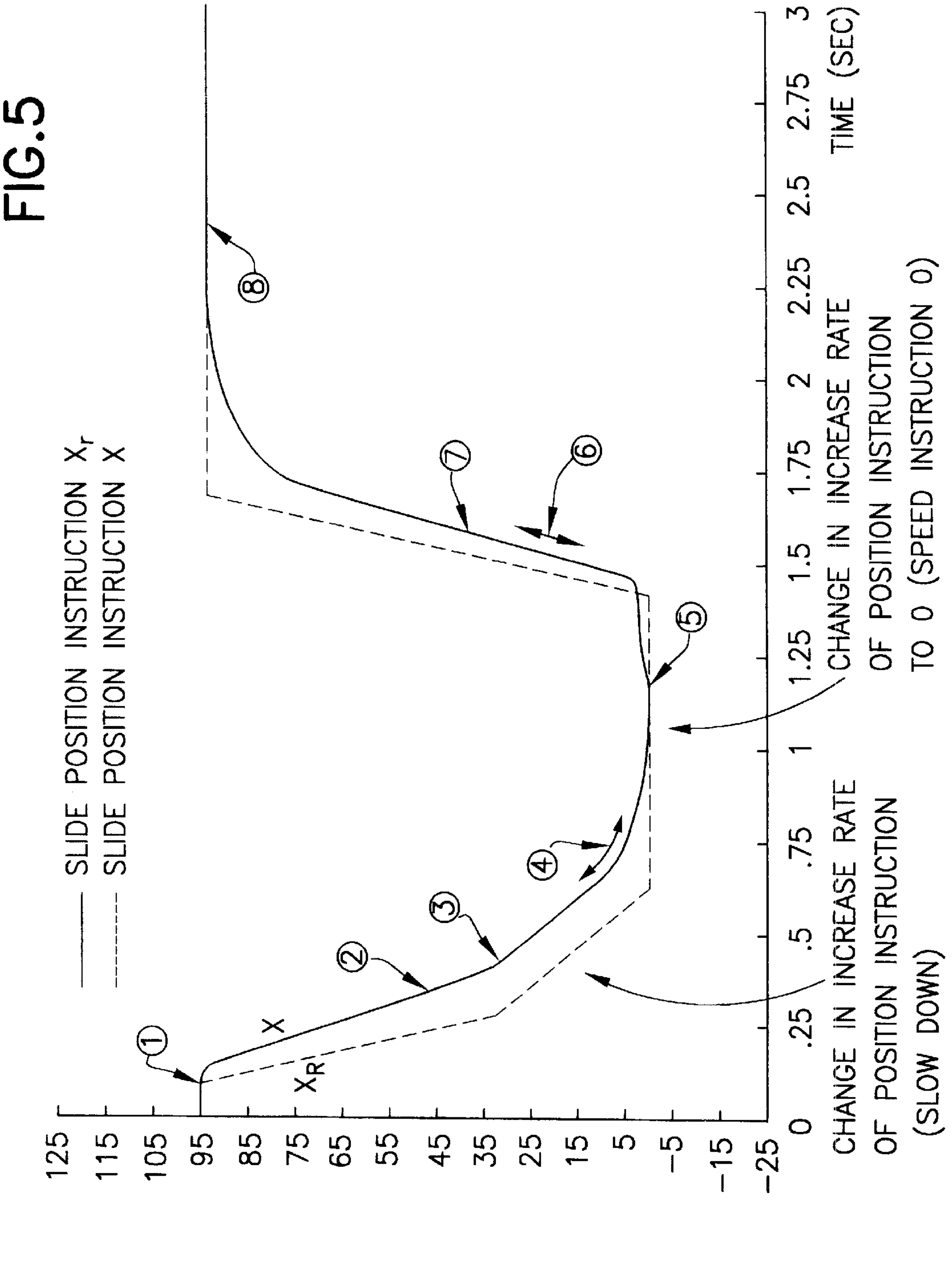
FIG. 5 showing slide position instruction Xr and actual slide position X when a drawing operation is performed.
Figure 6A:
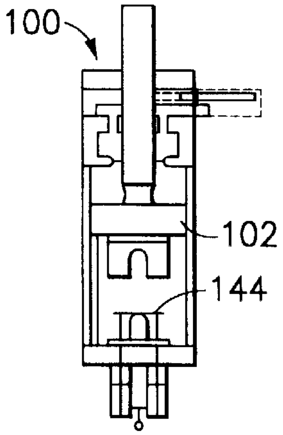
FIGS. 6(*a*) through 6(*h*) are drawings showing the slide positions and status of the drawing operation at each of the steps indicated in FIG. 5.
Figure 6B:
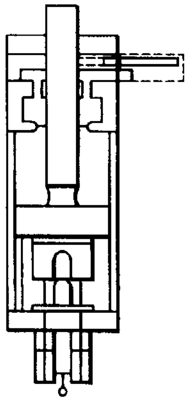
Figure 6C:
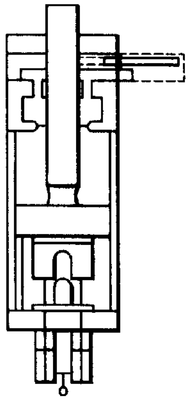
Figure 6D:
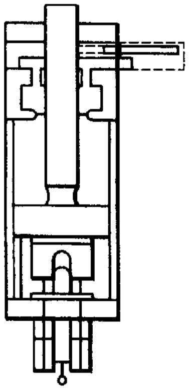
Figure 6E:
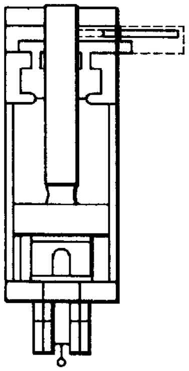
Figure 6F:
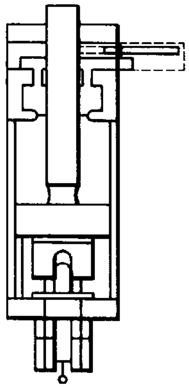
Figure 6G:
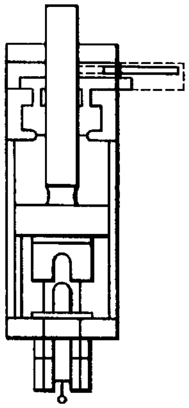
Figure 6H:
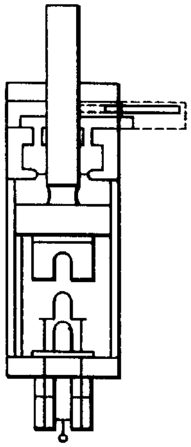

Referring now to FIG. 5, the dashed line indicates slide position instruction Xr when ring gear 114 is being driven. The solid line indicates the resulting position X of slide 102 controlled by slide position instruction Xr.

Referring now also to FIG. 6(*a*) through (*h*) show the positions of slide 102 and the state of molding material 144 being drawn at steps (1) through (8), respectively, in FIG. 5. The figures are based on results from calculations that assume ideal conditions. A detailed description of steps (1) through (8) will be provided later.

Figure 7:
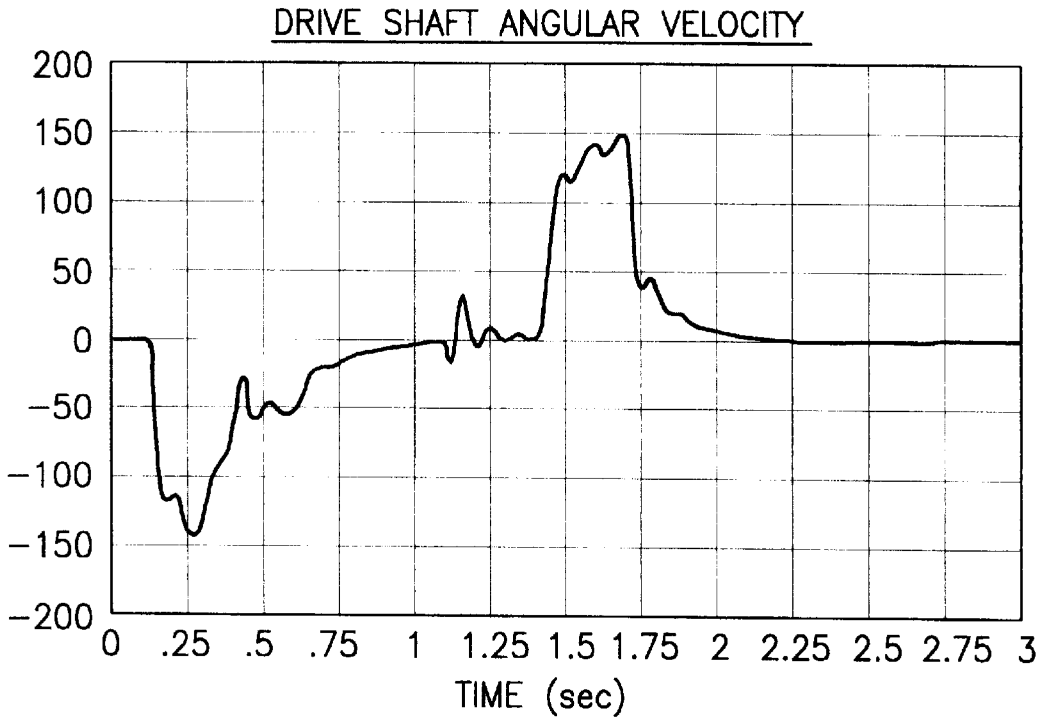
FIG. 7 is a drawing showing the drive shaft angular velocity for the drive shaft being controlled based on slide position instruction Xr shown in FIG. 5.

Referring to FIG. 7 there is shown the drive shaft angular velocity of drive shaft 304 as it is controlled based on slide position instruction Xr as shown in FIG. 5.

Figure 8:
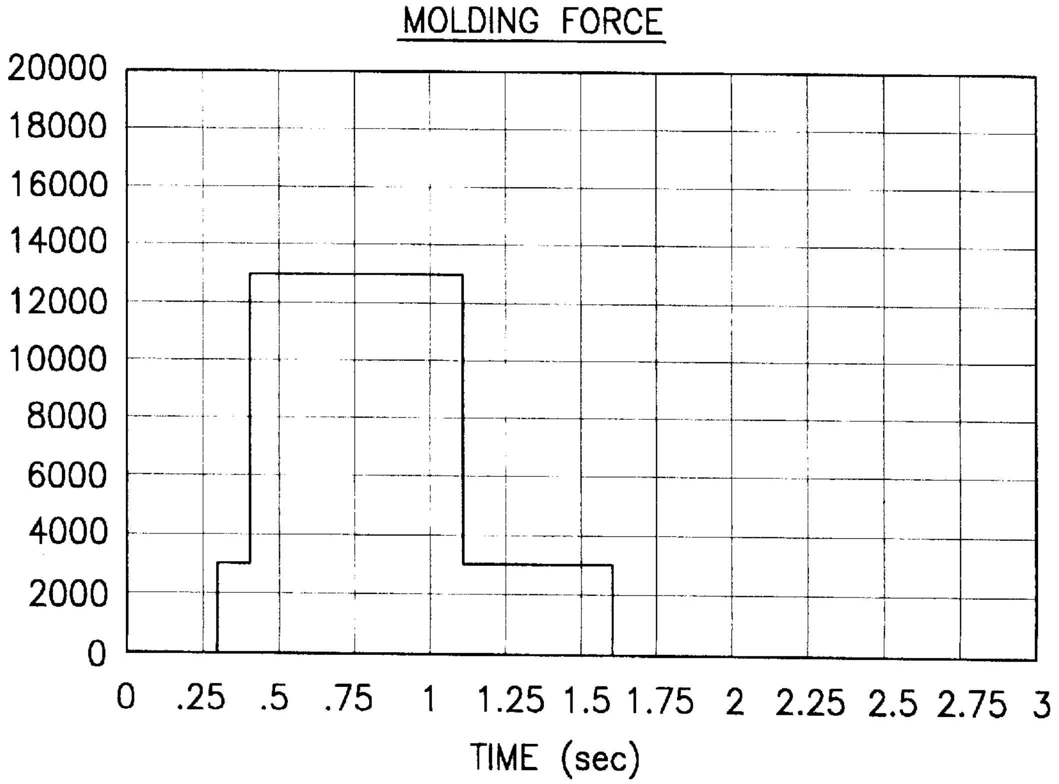
FIG. 8 is a drawing showing the molding force of the screw press as it is being controlled by slide position instruction Xr shown in FIG. 5.

Referring to FIG. 8, there is shown the force operating on screw press 100 (the molding force and the die cushion force).

Figure 9:
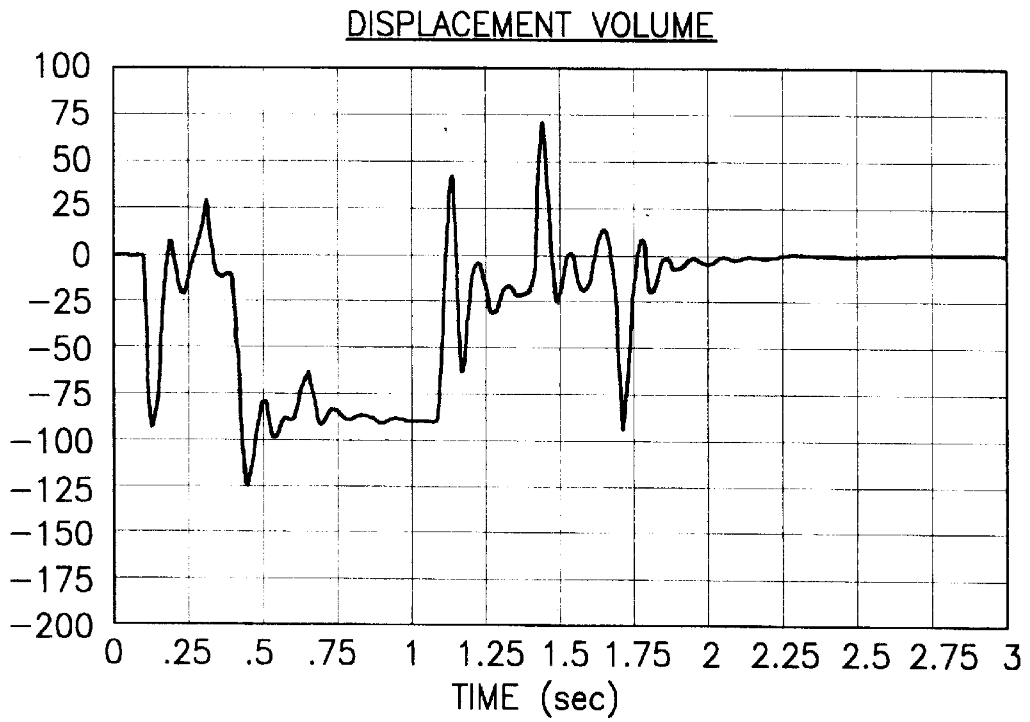
FIG. 9 is a drawing showing the displacement volume of the variable displacement pump/motor as it is being controlled by slide position instruction Xr shown in FIG. 5.

Referring to FIG. 9, there is shown the displacement volume of variable displacement pump/motor 302 over the molding cycle.

Figure 10:
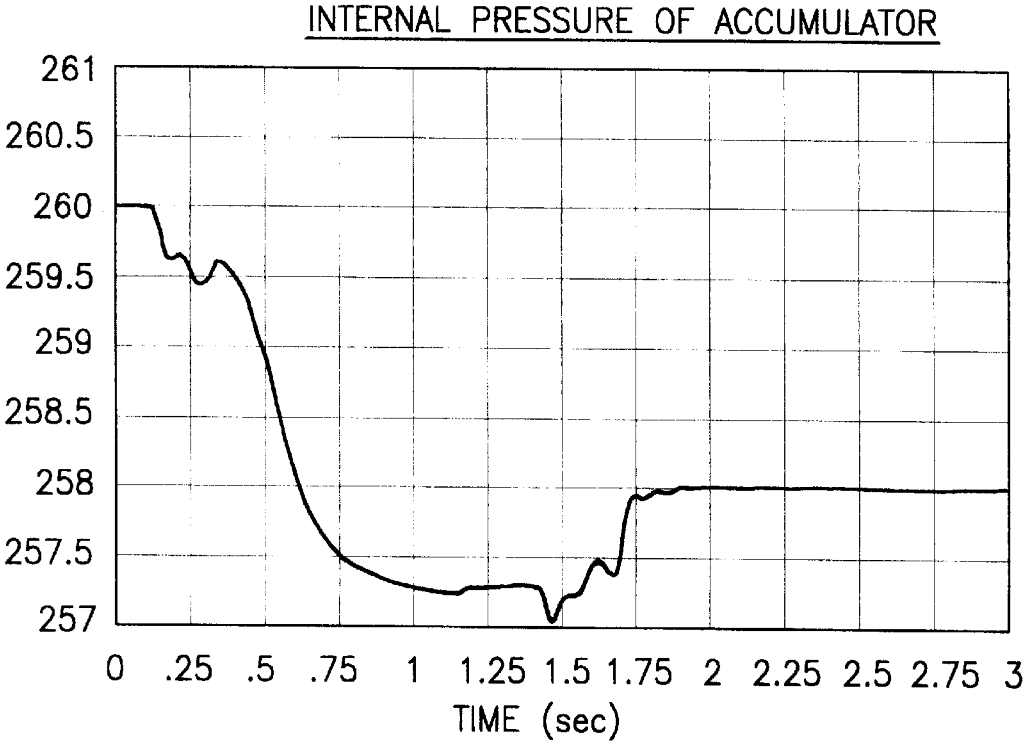
FIG. 10 is a drawing showing the changes in pressure at the accumulator as it is being controlled by slide position instruction Xr shown in FIG. 5.

Referring to FIG. 10, there is shown the internal pressure in accumulator 216 during the molding cycle.

Figure 11:
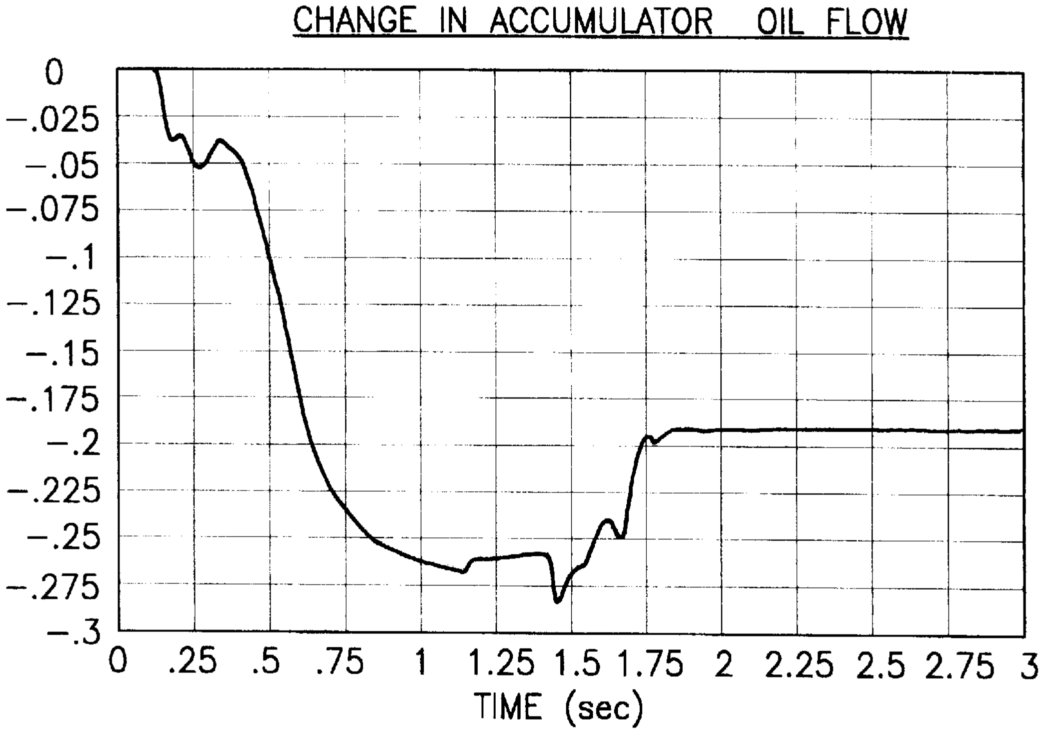
FIG. 11 is a drawing showing the changes in oil flow at the accumulator as it is being controlled by slide position instruction Xr shown in FIG. 5.

Referring to FIG. 11, there is shown oil flow into accumulator 216.

Figure 12:
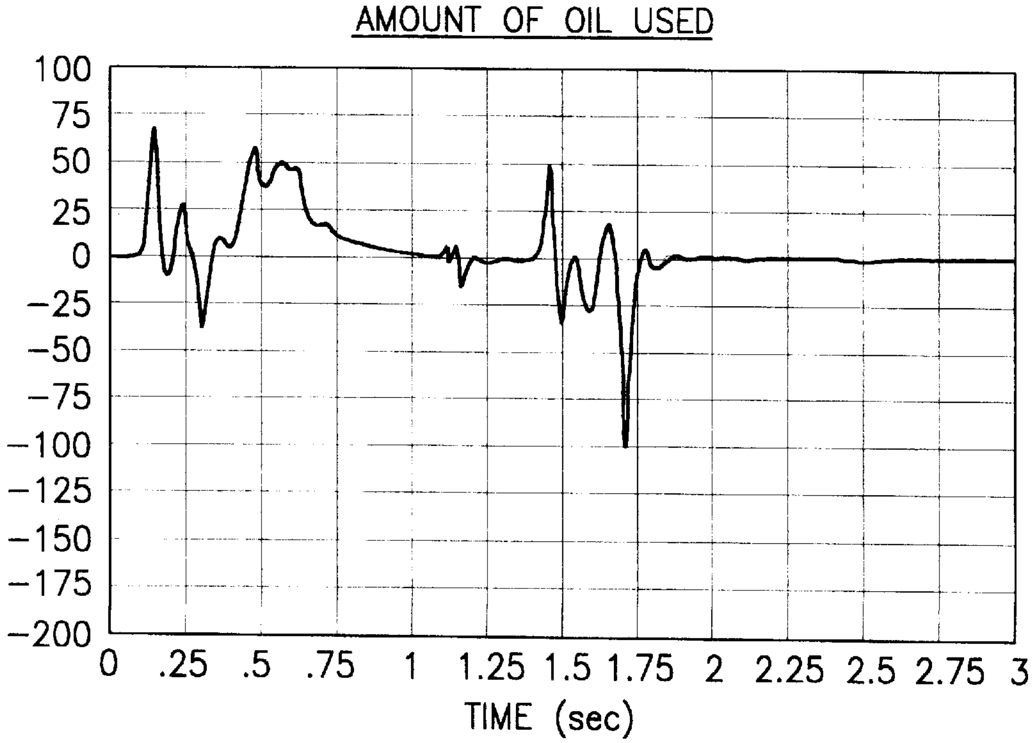
FIG. 12 is a drawing showing the amount of oil used in the accumulator as it is being controlled by slide position instruction Xr shown in FIG. 5.

Referring to FIG. 12, there is shown the amount of oil used during the molding cycle.

Returning to FIG. 5 the following is a description of steps (1)–(8) during the drawing operation.

Step (1): Slide at initial position (stopped)→begins moving down (active)

In step (1) slide 102 is stopped (cut-off valve 229 is closed and the displacement volume instruction signal is set to a fixed positive value in this embodiment to prevent slide 102 from falling due to its own weight).

Fluid pressure (or air pressure) moves die cushion cylinder 136 to a stop at its uppermost position. A ring-shaped plate holder is fixed to the upper portion of die cushion 134. Molding material 144 (a circular plate of material) is mounted on the plate holder.

Step (2): Slide 102 moves downward to bring upper die 130 into contact with molding material 144 (disposed on the plate holder on die cushion 134).

Referring to FIG. 5 the position curve of slide 102 follows slide position instruction Xr/time with a slight lag. Slide position instruction Xr/time (slide position instruction signal) is calculated either beforehand or real-time by a computer. Referring to FIG. 2 a displacement volume instruction signal is output based on the slide position instruction signal slide position signal X from slide position detector 140 and the drive shaft angular velocity signal from drive shaft angular velocity detector 142. Also in steps (1) and (2) switch 406C of first compensating network 406 shown in FIG. 3 is in the off state. This removes the phase-delay element and allows rapid transient response during the unloaded condition at start-up.

Slide position instruction Xr changes (slows down) at the position Xr=32. Also when slide position x is at x=45 and the die cushion cylinder is contacted a molding force of 3000 kgf begins to act on the workpiece as shown in FIG. 8. At this stage there is no slowdown in positioning because of the presence of the time delay in the response to slide position instruction Xr.

Referring to FIG. 9 in terms of energy efficiency the displacement volume that is used is limited to the amount required for the speedup (down=negative). Also the amount of oil flow used is proportional to the angular velocity and is just enough to provide an equilibrium with the torque corresponding to the speedup and the viscosity resistance.

Referring to FIG. 12 the oil flow is small.

Step (3): Start of the drawing process:

Slide 102 drives upper die 130 and molding material 144 into contact with lower die (punch) 132.

Referring to FIG. 8 a molding force of 13,000 kgf is applied and molding is begun. When this molding begins position x of slide 102 is at x=31. Switch 406C (FIG. 3) of first compensating network 406 is closed. This produces a high loop gain thus allowing the operating force to be accompanied by accurate positioning relative to the molding force and friction when the operation involves a gradual response.

At roughly the same time lagging after the slow-down in slide position instruction Xr the slide position is slowed down. Also activation of a displacement volume corresponding to the molding force is begun (see FIG. 9).

Referring to FIG. 10 while the slide is slowing down, the internal pressure in the accumulator temporarily increases due to the kinetic energy from the pumping action of variable displacement pump/motor 302 being retrieved into the accumulator during deceleration. Also slide position instruction Xr is kept at Xr=0.

Step (4): The drawing operation→The deceleration of the slide up to the position at the completion of drawing.

A displacement volume corresponding to the die cushion force and the molding force is active (FIG. 9). Referring to FIG. 10 the internal pressure in the accumulator is decreasing but around time 0.75 sec the gradient of the decrease becomes gentler. This is due to the interaction between the decrease in the molding energy accompanying the slowing down of the slide and the retrieval of kinetic energy that accompanies the slowdown.

Steps (5) and (6): Completion of the drawing operation (slide position X reaches slide position instruction Xr=0) and slide begins to move up (at the same time knocking out of the molded product by die cushion cylinder 136 is begun)

When the slide (position X) reaches slide position instruction Xr=0 the molding operation is complete (the slide does not descend any further) and the molding force is no longer active (see FIG. 8).

At the same time or thereafter switch 406C of first compensating network 406 shown in FIG. 3 is opened to improve the transient response. Accompanying this, the slide position begins at step (5) to increase slightly because it is not possible to output a suitable displacement instruction signal necessary for maintaining slide position x=0 against the die cushion force. (Around time 1.25 sec in FIG. 5→This is acceptable because it does not affect the molding operation. The die cushion cylinder thrust is active during the entire stroke.)

Referring to FIG. 5 at time 1.4 sec a raise position instruction is applied to slide 102. At this point excluding the initial speedup peak the displacement volume is a low value close to 0 (around time 1.4 sec in FIG. 9). The internal pressure of the accumulator is increased (excluding the initial speedup peak timing).

The thrust used to move upward is provided by the force remaining from the die cushion cylinders knocking out of the molded product. Thus slide 102 is raised without requiring the output from variable displacement pump/motor 302. Furthermore the surplus cushion force x upward stroke energy (negative work for slide 102) is retrieved by the accumulator.

Step (7): Die cushion cylinder's thrusting operation completed after molded product is disengaged from lower die 132 At slide position x=45 the die cushion cylinder stroke is at its uppermost position and the thrusting operation of the die cushion cylinder is completed. Slide position instruction Xr is kept at its uppermost stopped position (position for removing the molded product) Xr–95 and slide 102 (slide position X) follows this instruction.

Step (8): Slide stopped at workpiece removal position (completion of one cycle) At slide position instruction Xr=95 external forces such as the molding force are not present (minimal). Thus the lag accuracy (position accuracy) is relatively good.

Accumulator 216 is charged initially by hydraulic pump 208 with a (small) amount of oil corresponding to the average consumption for one cycle. This was not described above since the description of operations covered calculations for only a single cycle. Also the above description covers only one of many possible methods of operation.

Figure 13:
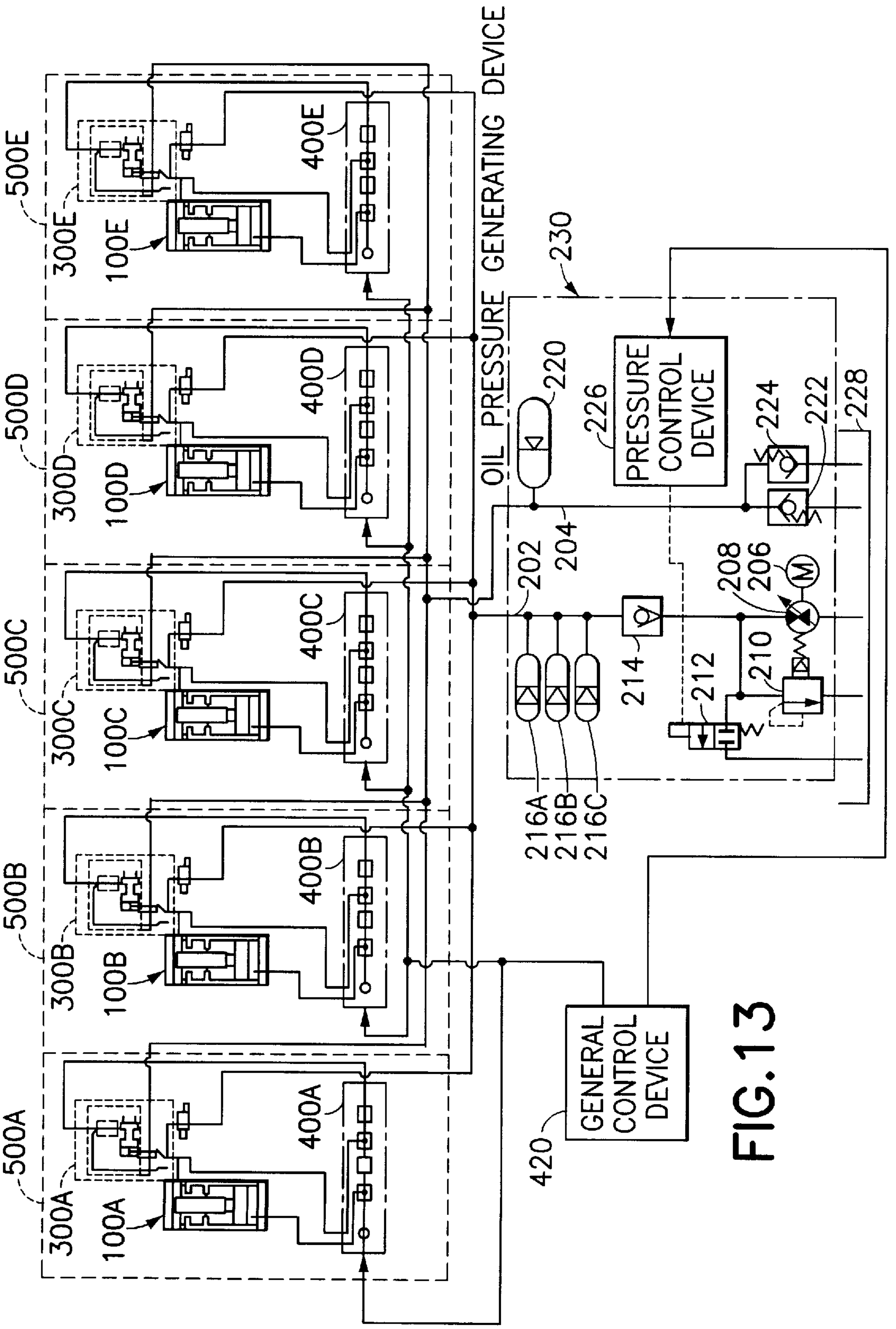
FIG. 13 is a schematic diagram showing a second embodiment of the slide driving device for presses of the present invention.

Referring to FIG. 13 there is shown an example of the second embodiment of the slide driving device for presses of the present invention.

In this slide driving device for presses a single oil pressure generating device 230 drives a plurality of basic units 500A–500E. Basic units 500A–500E respectively include screw presses 100A–100E rotation drive devices 300A–300E and slide control circuits 400A–400E. Screw presses 100A–100E rotation drive devices 300A–300E and slide control circuits 400A–400E have the same respective structures as screw press 100, rotation drive device 300 and slide control circuit 400 in FIG. 2. Therefore detailed descriptions of these elements will be omitted.

Oil pressure generating device 230 has essentially the same structure as that of oil pressure generating device 200 shown in FIG. 2. Therefore parts that are in common with FIG. 2 are assigned the same numerals and the corresponding descriptions are omitted. In oil pressure generating device 230 three accumulators 216A, 216B and 216C are connected to high-pressure pipe 202 thus providing more features than oil pressure generating device 200.

High-pressure pipe 202 and low-pressure pipe 204 of oil pressure generating device 230 are connected to rotation drive devices 300A–300E of basic units 500A–500E.

A general control device 420 performs general control over basic units 500A–500E by sending control signals to pressure control device 226 of oil pressure generating device 230 and slide control circuits 400A–400E of basic units 500A–500E.

In this embodiment screw presses 100A–100E are used as the press. However the present invention is not restricted to this. Other types of presses such as clamp presses can be used as long as the press can use the rotation drive force from rotation drive devices 300A–300E to drive the slide. Also different types of presses can be used together.

Figure 14:
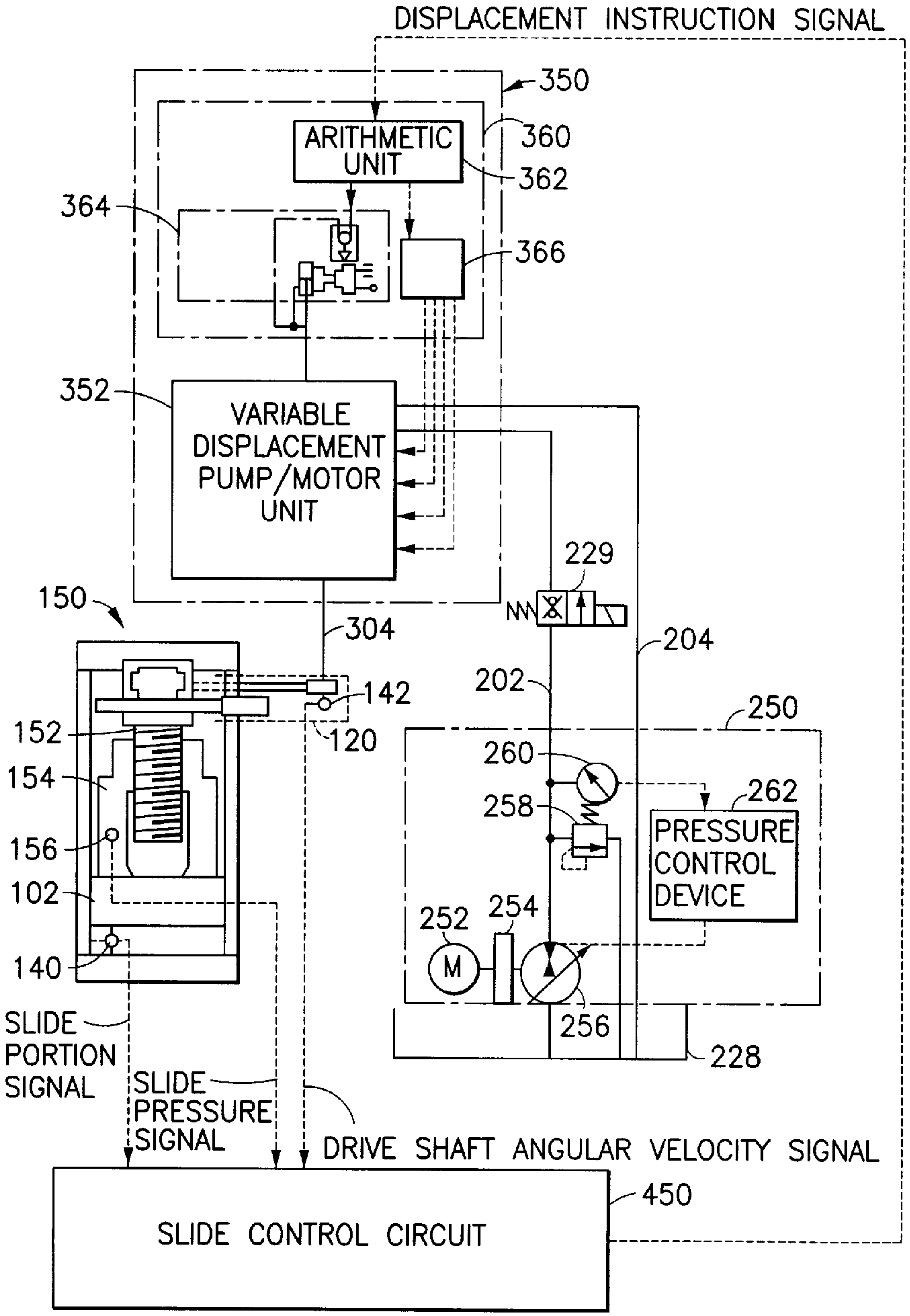
FIG. 14 is a schematic diagram showing a third embodiment of the slide driving device for presses of the present invention.

Referring to FIG. 14 there is shown a third embodiment of the slide driving device for presses of the present invention. Parts that are in common with FIG. 2 are assigned the same numerals and the corresponding descriptions are omitted.

The slide driving device for presses drives slide 102 using a screw press 150. The slide driving device includes an oil pressure generating device 250 providing pressurized fluid to a rotation drive device 350. A slide control circuit 450 receives feedback signals and produces control signals for control of screw press 150.

The main difference between screw press 150 and screw press 100 in FIG. 2 is in the screw mechanism which serves as the mechanism to drive slide 102. The screw mechanism of screw press 150 employs a drive screw 152 which is rotated through gearing similar to the drive of drive nut 104 in the embodiment of FIG. 2. A driven nut 154 is threaded onto drive screw, and is connected at its lower end to slide 102. Thus, in this embodiment, drive screw 152 rotates while drive nut 104 is non-rotating. When drive screw 152 is rotated driven nut 154 and slide 102 are moved up and down. Also a force detector 156 is disposed on driven nut 154. Force detector 156 detects the slide pressure applied to driven nut 154 (i.e. to slide 102) and sends a slide pressure signal indicating the detected pressure to slide control circuit 430.

Oil pressure generating device 250 includes a electric motor 252 with a flywheel 254 driving a variable displacement pump/motor 256. A safety valve 258 and a pressure detector 260 are connected to high pressure pipe 202. A pressure control device 262 receives a pressure signal from pressure detector 260, and produces a control signal for connection to variable displacement pump/motor in response thereto.

The rotation drive force from electric motor 252 is transferred via flywheel 254 to variable displacement pump/motor 256, thereby rotating variable displacement pump/motor 256. This rotation of variable displacement pump/motor 256 discharges pressurized oil which increases the circuit pressure in high-pressure pipe 202.

Pressure control device 262 controls the swash-plate tilt (displacement volume) of variable displacement pump/motor 256 so that the pressure in high-pressure pipe 202 is maintained approximately equal to a reference pressure specified beforehand. The swash-plate tilt of variable displacement pump/motor 256 is controlled based on the difference between the pre-set reference pressure and the pressure detected by pressure detector 260.

Thus the pressure within high-pressure pipe 202 is controlled to be a roughly constant reference pressure (e.g. 260 $kg/cm^2$).

Oil pressure generating device 250 temporarily stores the kinetic energy accompanying the slowdown of screw press 150 in flywheel 254. In other words when screw press 150 slows down the pumping action of rotation drive unit 352 described later increases the pressure within high-pressure pipe 202. At this point the swash-plate tilt of variable displacement pump/motor 256 is controlled so that the pressure within high-pressure pipe 202 does not exceed the reference pressure described above. Thus the oil pressure in high-pressure pipe 202 drives variable displacement pump/motor 256 so that it acts as a motor and this motor action increases the rotation speed of flywheel 254.

Rotation drive device 350 receives pressurized oil from oil pressure generating device 250 at a roughly constant pressure. Rotation drive device 350 includes a displacement volume changing device 360 and a rotation drive unit 352.

Displacement volume changing device 360 includes an arithmetic unit 362 a first displacement volume changing device 364 and a second displacement volume changing device 366.

Figure 15:
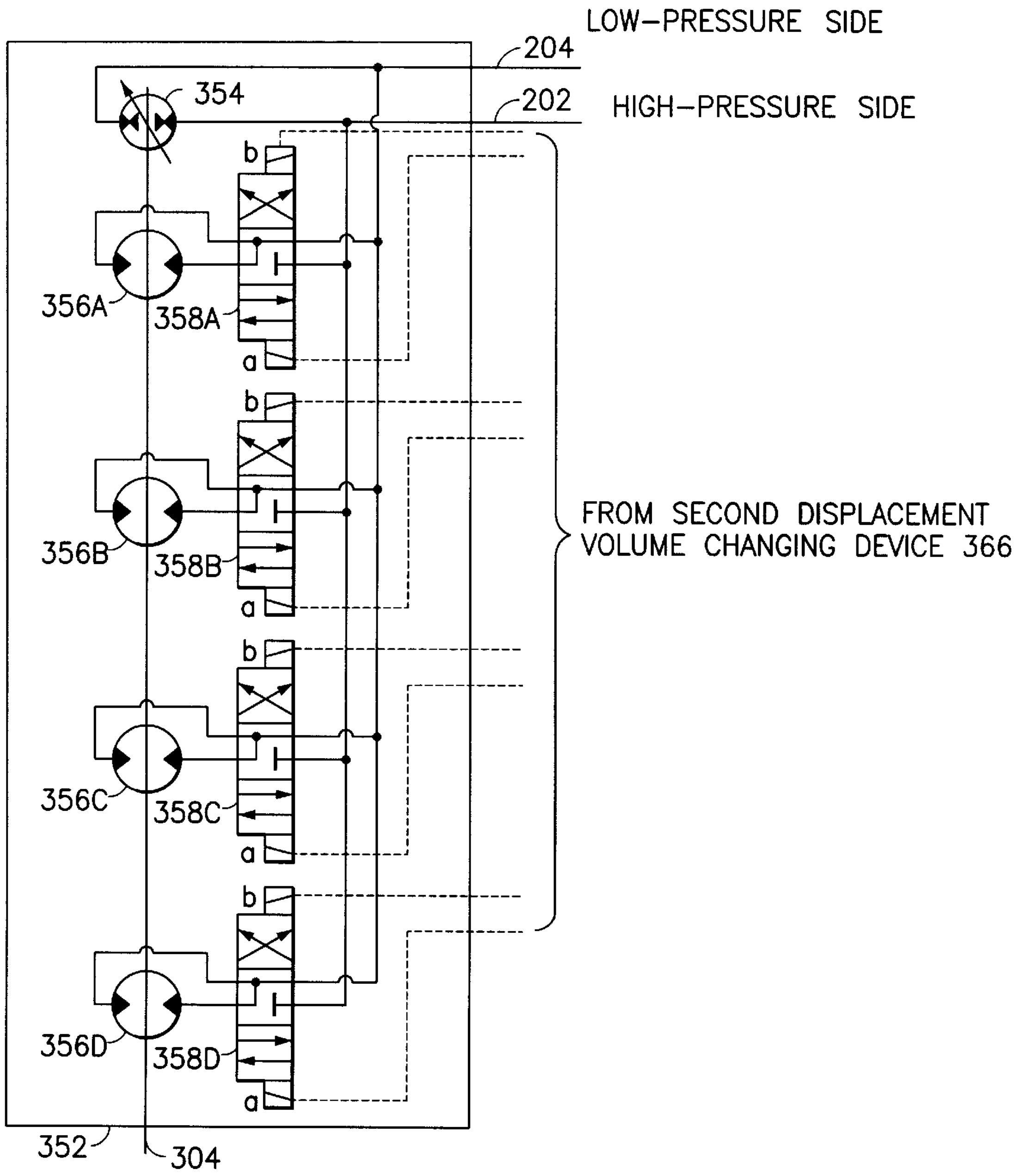
FIG. 15 is a block diagram showing the details of the variable displacement pump/motor unit of FIG. 14.

Referring to FIG. 15, rotation drive unit 352 includes a single variable displacement pump/motor 354 and four fixed volume pump/motors 356A–356D. The flow of pressurized fluid from variable displacement pump/motor 354 to fixed volume pump/motors 356A–356D is controlled by respective four-port three-position electromagnetic selector valves 358A–358D.

Returning now to FIG. 14, based on a displacement volume instruction signal sent from slide control circuit 450, arithmetic unit 362 sends a first displacement volume instruction signal for controlling a first displacement volume changing device 364 and a second displacement volume instruction signal for controlling a second displacement volume changing device 366. The sum of the first displacement volume instruction signal and the second displacement volume instruction signal corresponds to the displacement volume instruction signal sent to slide control circuit 450.

The structure of first displacement volume changing device 364 is identical to displacement volume varying device 310 shown in FIG. 2 so the corresponding descriptions will be omitted. Referring again to FIG. 15 second displacement volume changing device 366 sends control signals to four-port three-position electromagnetic selector valves 358A–358D. By setting four-port three-position electromagnetic selector valves 358A–358D to the neutral position both ports of fixed volume pump/motors 356A–356D are connected to oil tank 228 via low-pressure pipe 204. Pressurized oil is prevented from being sent to fixed volume pump/motors 356A–356D. When either a solenoid (a) or a solenoid (b) of four-port three-position electromagnetic selector valves 358A–358D is energized, the position of four-port three-position electromagnetic selector valves 358A–358D is switched away from the neutral position and the corresponding port of fixed volume pump/motors 356A–356D is connected to high-pressure pipe 202 and low-pressure pipe 204. By energizing either solenoid (a) or solenoid (b) of four-port three-position electromagnetic selector valves 358A–358D the port of fixed volume pump/motors 356A–356D feeding high-pressure oil is switched, thus allowing the direction (polarity) of the displacement volume to be controlled.

Displacement volume changing device 360 provides linear control of the displacement volume for variable displacement pump/motor 354 and also controls the displacement volumes of the four fixed volume pump/motors 356A–356D. This results in the displacement volume of rotation drive unit 352 to be proportional to the displacement volume instruction signal sent from slide control circuit 450.

In this embodiment the rotation drive unit includes a single variable displacement pump/motor and a plurality of fixed volume pump/motors. However it would also be possible to have the rotation drive unit include only a plurality of variable displacement pump/motor or only a plurality of fixed volume pump/motors.

As described above slide control circuit 450 outputs a displacement volume instruction signal for controlling the displacement volume of rotation drive unit 352. Slide control circuit 450 receives a slide position signal a drive shaft angular velocity signal and a slide pressure signal from slide position detector 140 drive shaft angular velocity detector 142 and force detector 156 respectively.

Figure 16:
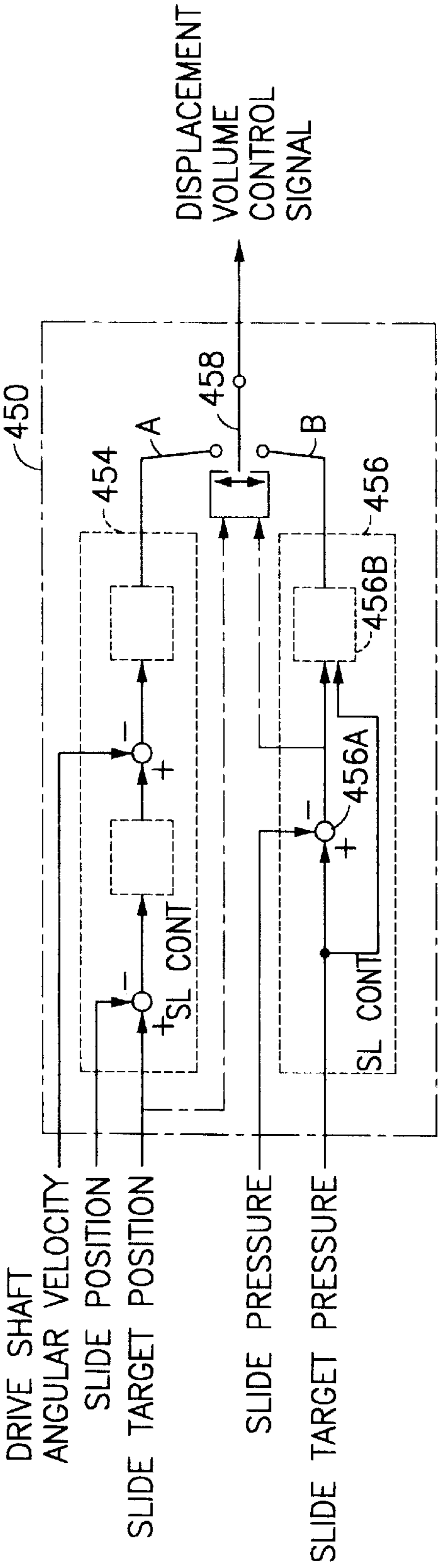
FIG. 16 is a block diagram showing a first embodiment of the slide control circuit in FIG. 15.

Referring to FIG. 16 there is shown a block diagram of the first embodiment of slide control circuit 450. A slide control circuit 454 outputs a displacement volume instruction signal A and a slide control circuit 456 outputs a displacement volume instruction signal B. A selector switch 458 connects one or the other signal to the output. The structure of slide control circuit 454 is identical to that of slide control circuit 400 so the corresponding descriptions will be omitted.

Slide control circuit 456 includes an adder 456A and a compensating network 456B. A slide target pressure signal indicating the target pressure for slide 102 is sent to the positive input of adder 456A and a slide pressure feedback signal from force detector 156 is sent to the negative input of adder 456A. Adder 456A determines the difference between these two input signals. The difference or error signal is sent to compensating network 456B. A slide target pressure signal is sent to the other input of compensating network 456B. Compensating network 456B uses these two input signals to determine a displacement volume instruction signal B. Selector switch 458 selects either displacement volume instruction signal A or B based on the slide target position signal or the difference signal from adder 456A.

Figure 17:
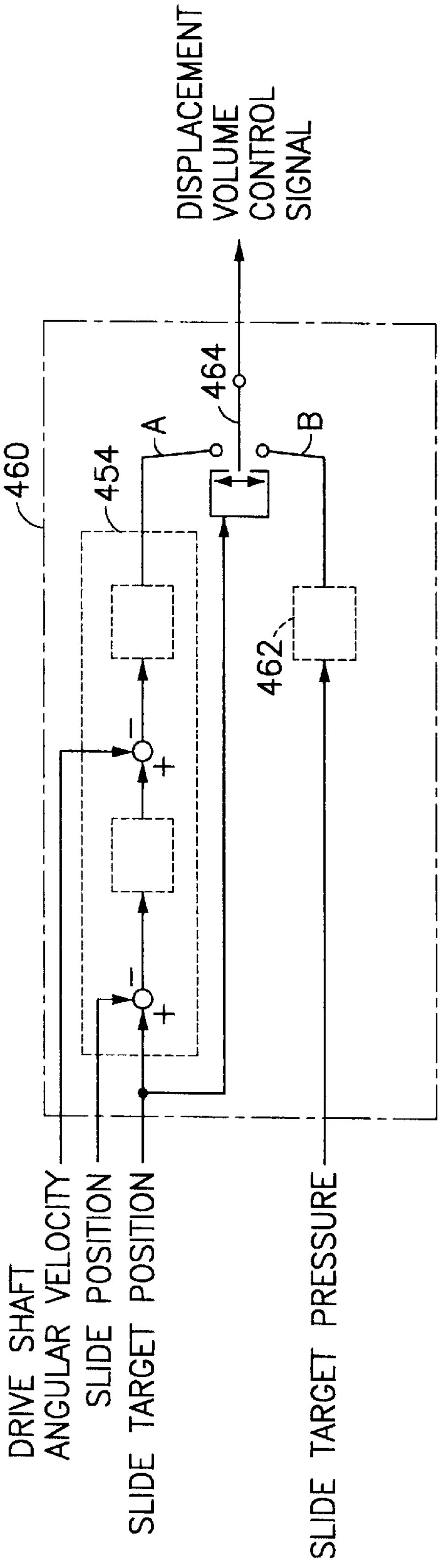
FIG. 17 is a block diagram showing a second embodiment of the slide control circuit shown in FIG. 14.

Referring to FIG. 17, a second embodiment of slide control circuit 460 includes slide control circuit 454 which outputs displacement volume instruction signal A and a compensating network 462 which outputs displacement volume instruction signal B. A selector switch 464 selects one of the signals to be output. The structure of slide control circuit 454 is identical to that of slide control circuit 400 shown in FIG. 2 so the corresponding descriptions are omitted.

A slide target pressure signal is sent to compensating network 462. Based on this input signal compensating network 456B generates displacement volume instruction signal B. Based on the slide target position signal selector switch 458 selects either displacement volume instruction A or B to be output.

Figure 20:
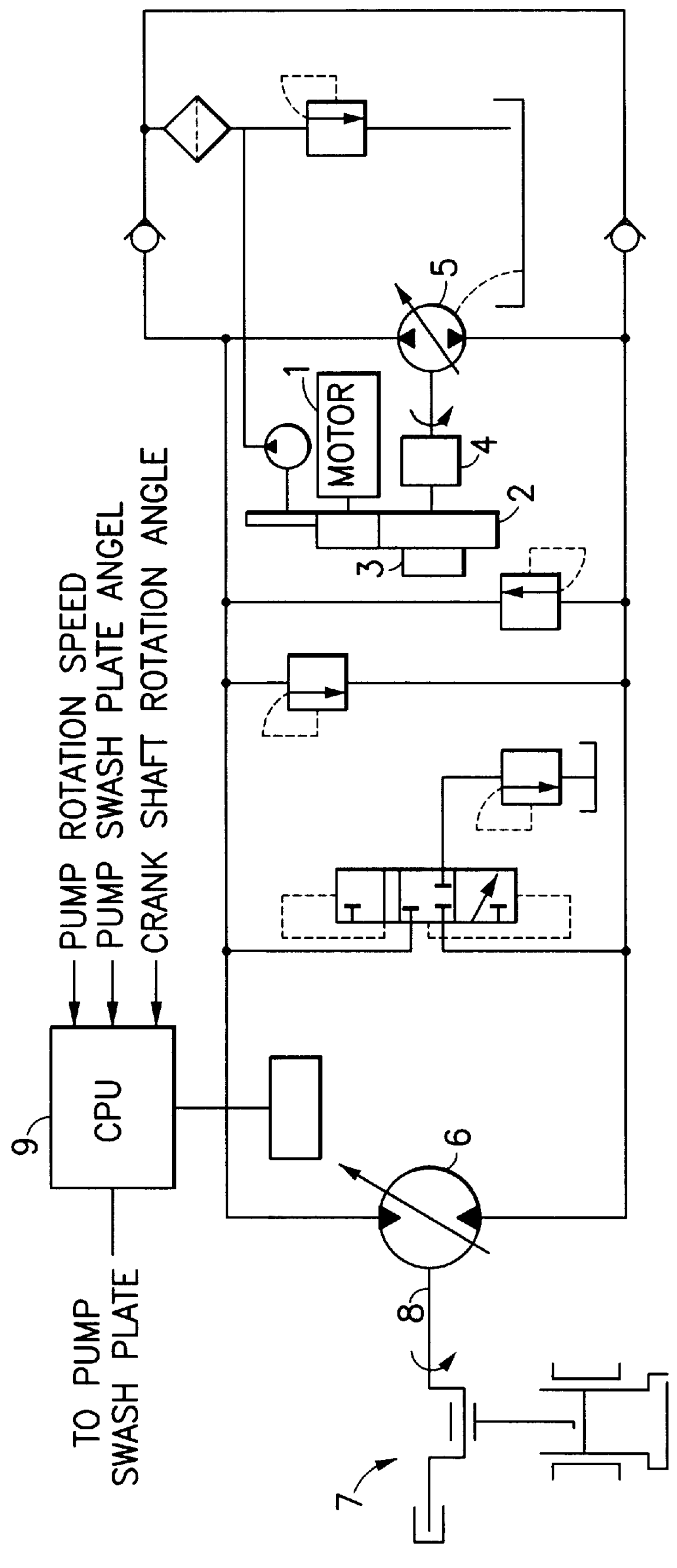
FIG.20 PRIOR ART
FIG. 20 is a drawing showing an example of a conventional slide driving device for presses.
Figure 21A:
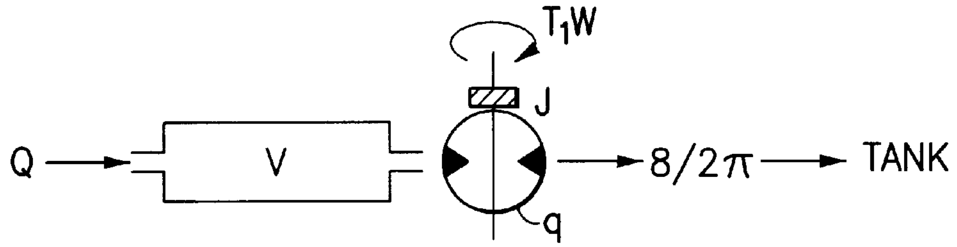
FIG.21a PRIOR ART
FIG. 21(*a*) is a schematic diagram of the slide driving device for presses shown in FIG. 20.
Figure 21B:
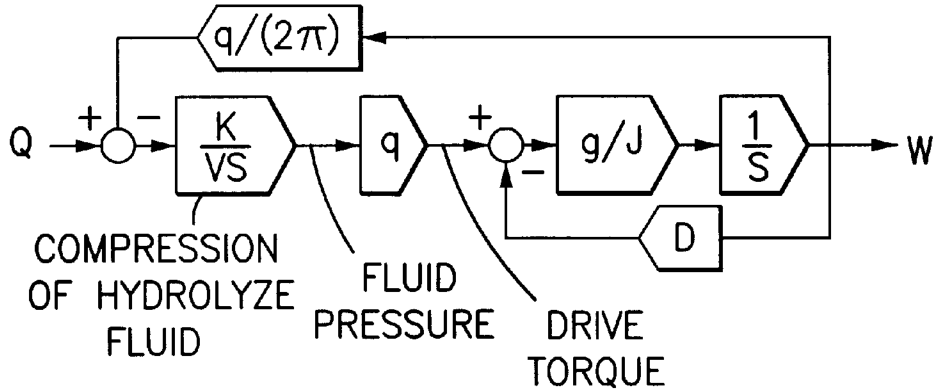
FIG.21b PRIOR ART
Figure 21C:
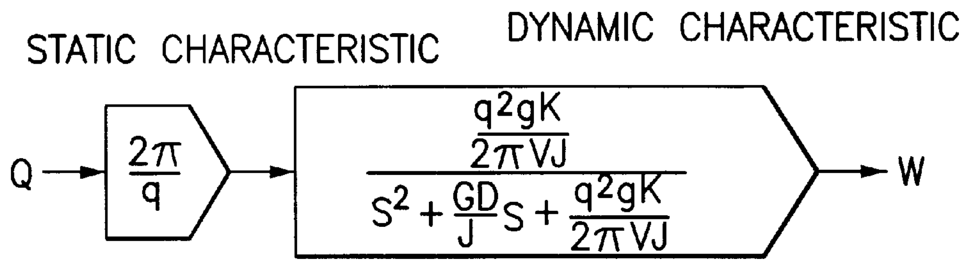
FIG.21c PRIOR ART

Referring to FIG. 18 and FIG. 19 there are shown performance comparison tables comparing the device of the present invention with conventional mechanical hydraulic electronic servo devices and the conventional device shown in FIG. 20. As these tables make clear the device of the present invention provide good characteristics in a variety of different areas. Also in this embodiment a slide position signal is used as the position signal but it would also be possible to use a drive shaft angle signal. The drive shaft angular velocity is used for the speed signal but it would also be possible to use the slide speed. Furthermore the press used in the present invention is not restricted to screw presses. The present invention can be implemented for other types of presses such as crank presses as well as presses having a plurality of slides. Also in this embodiment oil was used as the hydraulic fluid but the present invention is not restricted to this. Water or other fluids can be used as well.

With the slide driving device for presses of the present invention as described above the flow of the hydraulic fluid can be significantly reduced thus allowing a more compact device. Furthermore the device is highly controllable and uses energy efficiently.

Having described preferred embodiments of the invention with reference to the accompanying drawings it is to be understood that the invention is not limited to those precise embodiments and that various changes and modifications may be effected therein by one skilled in the art without departing from the scope or spirit of the invention as defined in the appended claims.

What is claimed is:

1. A slide driving device for a press comprising:

means for generating pressure in a hydraulic fluid;

said means for generating pressure includes an accumulator;

means for controlling said pressure to maintain said pressure within said accumulator within a prescribed range;

said pressure being substantially constant during changes in a load on said press;

rotating means, responsive to said pressure, for converting energy from said hydraulic fluid into rotational power;

said rotating means including means for absorbing rotational drive force from said slide through said means for applying rotational power, and for converting said rotational drive force into stored energy for said hydraulic fluid, said stored energy being stored temporarily in said accumulator;

said rotating means includes at least one variable displacement pump/motors and at least one fixed volume pump/motors;

means for applying said rotational power to a slide driving mechanism of said press;

means for varying a displacement volume of said rotating means; and means for controlling said displacement volume, thereby controlling a drive torque applied to said slide driving mechanism.

2. A slide driving device for a press as described in claim 1 wherein said press is a screw press including a screw mechanism that drives said slide.

3. A slide driving device for a press as described in claim 1 further comprising:

detecting means for detecting at least one of an angle of a drive shaft of said slide driving mechanism and a position of said slide;

said displacement volume controlling means comprises:

means for producing an instruction for at least one of a target position for said slide of said press and a target angle for said drive shaft; and said means for varying being responsive to a difference between at least one of a) said target position and said position of said slide and b) said drive shaft target angle and said drive shaft angle.

4. A slide driving device for a press as described in claim 1 further comprising:

first means for detecting at least one of a) an angle of a drive shaft of said slide driving mechanism and b) a position of said slide; and second means for detecting at least one of c) a speed of said slide and d) an angular velocity of said drive shaft;

wherein:

said displacement volume controlling means includes means for issuing an instruction for at least one of e) a target position of said slide and f) a target angle for said drive shaft; and said means for controlling being responsive to a first difference and a second difference;

said first difference being a difference between target and actual values of said slide position or said drive shaft angle; and said second difference being a difference between an amount of action generated by said first difference and one of a speed of said slide and said angular velocity.

5. A slide driving device for a press as described in claim 1 further comprising:

means for detecting one of a speed of said slide and an angular velocity of a drive shaft;

said means for controlling includes means for producing one of a) an instruction for a target position for said slide and b) a target angular velocity for said drive shaft; and said means for controlling being responsive to a difference between one of c) said slide target position and said slide position and d) said drive shaft target angle and said drive shaft angle detected by said detecting means.

6. A slide driving device for a press as described in claim 1 further comprising:

first means for detecting at least one of a) an angle of a drive shaft of said slide driving mechanism and b) a position of said slide;

second means for detecting at least one of c) a speed of said slide and d) an angular velocity of said drive shaft; and third means for detecting a force acting on said slide;

said means for controlling includes:

first instruction means for producing an instruction for at least one of e) a target position for said slide and f) a target angle for said drive shaft;

second instruction means for producing an instruction for a target pressure for said slide of said press;

first means for controlling; second means for controlling; and means for selecting either said first means for controlling and said second means for controlling;

said first means for controlling being effective for controlling the displacement volume of said rotating means based on a first difference and a second difference;

said first difference being the difference between one of g) said slide target position and said slide position and h) said drive shaft target angle and said slide position;

said drive shaft angle and said second difference being a difference between an amount of action generated by said first difference and one of a speed of said slide and of said angular velocity of said drive shaft; and said second means for controlling being effective to control said displacement volume in response to a third difference between said target pressure and said slide force.

7. A slide driving device for a press as described in claim 1 further comprising:

first means for detecting one of a) an angle of a drive shaft of said slide driving mechanism and b) a position of said slide;

second means for detecting one of c) a speed of said slide and d) an angular velocity of said drive shaft;

said means for controlling includes:

first means for producing one of d) a target position for said slide and e) a target angle for said drive shaft;

second means for producing a target pressure for said slide;

first means for controlling;

second means for controlling; and means for selecting either said first means for controlling or said second means for controlling;

said first means for controlling being effective to control said displacement volume of said rotating means in response to a first difference and a second difference;

said first difference being the difference between f) one of said slide target position and said drive shaft target angle and said slide position and g) said drive shaft angle;

said second difference being a difference between an amount of action generated by said first difference and one of the speed of said slide and the angular velocity of said drive shaft; and said second controlling means controlling the displacement volume for said rotating means based on the target pressure received from said second instructing means.

8. A slide driving device for a press comprising:

means for generating pressure in a hydraulic fluid;

said pressure being substantially constant during changes in a load on said press;

said means for generating pressure includes an electric motor, a flywheel driven by said electric motor, and a variable displacement pump/motor receiving rotational drive force from said flywheel;

said means for controlling including means for controlling a swash-plate tilt of said variable displacement pump/motor in a manner effective to maintain a fluid pressure of said hydraulic fluid discharged from said variable displacement pump/motor substantially constant;

rotating means, responsive to said pressure, for converting energy from said hydraulic fluid into rotational power;

said rotating means is effective to receive rotational drive force transferred from said slide via said means for applying and to convert said rotational drive force into stored energy for said hydraulic fluid;

said rotating means includes at least one variable displacement pump/motors and at least one fixed volume pump/motors;

means for transferring said stored energy from said flywheel to produce motor action of said variable displacement pump/motor of said fluid pressure generating means;

means for applying said rotational power to a slide driving mechanism of said press;

means for varying a displacement volume of said rotating means;

means for controlling said displacement volume, thereby controlling a drive torque applied to said slide driving mechanism.

9. A slide driving device for a press as described in claim 8 wherein said press is a screw press including a screw mechanism that drives said slide.

10. A slide driving device for a press as described in claim 8 further comprising:

detecting means for detecting at least one of an angle of a drive shaft of said slide driving mechanism and a position of said slide;

said displacement volume controlling means comprises:

means for producing an instruction for at least one of a target position for said slide of said press and a target angle for said drive shaft; and said means for varying being responsive to a difference between at least one of a) said target position and said position of said slide and b) said drive shaft target angle and said drive shaft angle.

11. A slide driving device for a press as described in claim 8 further comprising:

first means for detecting at least one of a) an angle of a drive shaft of said slide driving mechanism and b) a position of said slide; and second means for detecting at least one of c) a speed of said slide and d) an angular velocity of said drive shaft;

wherein:

said displacement volume controlling means includes means for issuing an instruction for at least one of e) a target position of said slide and f) a target angle for said drive shaft; and said means for controlling being responsive to a first difference and a second difference;

said first difference being a difference between target and actual values of said slide position or said drive shaft angle; and said second difference being a difference between an amount of action generated by said first difference and one of a speed of said slide and said angular velocity.

12. A slide driving device for a press as described in claim 8 further comprising:

means for detecting one of a speed of said slide and an angular velocity of a drive shaft;

said means for controlling includes means for producing one of a) an instruction for a target position for said slide and b) a target angular velocity for said drive shaft; and said means for controlling being responsive to a difference between one of c) said slide target position and said slide position and d) said drive shaft target angle and said drive shaft angle detected by said detecting means.

13. A slide driving device for a press as described in claim 8 further comprising:

first means for detecting at least one of a) an angle of a drive shaft of said slide driving mechanism and b) a position of said slide;

second means for detecting at least one of c) a speed of said slide and d) an angular velocity of said drive shaft; and third means for detecting a force acting on said slide;

said means for controlling includes:

first instruction means for producing an instruction for at least one of e) a target position for said slide and f) a target angle for said drive shaft;

second instruction means for producing an instruction for a target pressure for said slide of said press;

first means for controlling; second means for controlling; and means for selecting either said first means for controlling and said second means for controlling;

said first means for controlling being effective for controlling the displacement volume of said rotating means based on a first difference and a second difference;

said first difference being the difference between one of g) said slide target position and said slide position and h) said drive shaft target angle and said slide position;

said drive shaft angle and said second difference being a difference between an amount of action generated by said first difference and one of a speed of said slide and of said angular velocity of said drive shaft; and said second means for controlling being effective to control said displacement volume in response to a third difference between said target pressure and said slide force.

14. A slide driving device for a press as described in claim 8 further comprising:

first means for detecting one of a) an angle of a drive shaft of said slide driving mechanism and b) a position of said slide;

second means for detecting one of c) a speed of said slide and d) an angular velocity of said drive shaft;

said means for controlling includes:

first means for producing one of d) a target position for said slide and e) a target angle for said drive shaft;

second means for producing a target pressure for said slide;

first means for controlling;

second means for controlling; and means for selecting either said first means for controlling or said second means for controlling;

said first means for controlling being effective to control said displacement volume of said rotating means in response to a first difference and a second difference;

said first difference being the difference between f) one of said slide target position and said drive shaft target angle and said slide position and g) said drive shaft angle;

said second difference being a difference between an amount of action generated by said first difference and one of the speed of said slide and the angular velocity of said drive shaft; and said second controlling means controlling the displacement volume for said rotating means based on the target pressure received from said second instructing means.

15. A slide driving device for driving a slide of a press, comprising:

a variable displacement pump/motor;

said variable displacement pump/motor producing a pressurized fluid;

rotating means for driving said slide in response to said pressurized fluid;

means for controlling a displacement volume of said variable displacement pump/motor in response to a deviation of a measured parameter of said slide driving device from at least one target parameter, whereby actuation of said slide is forced to conform generally to said at least one target parameter;

said means for controlling includes proportional compensation during a first portion of a slide cycle, and a sum of proportional compensation and an integral compensation during a second portion of a slide cycle; and means for storing, temporarily, excess energy during a portion of a molding cycle.

16. A slide driving device according to claim 15, wherein said proportional compensation is activated alone when rapid movement of said slide under low load is required.

17. A slide driving device according to claim 15 wherein said sum is activated when high force and low error in position of said slide is required during a molding operation.

18. A slide driving device according to claim 15, wherein said means for storing includes an accumulator.

19. A slide driving device according to claim 15, wherein said means for storing includes a flywheel.

20. A slide driving device according to claim 15, wherein said target parameter includes at least one of a slide speed, a slide force, a slide position, and a drive shaft angular velocity.

* * * * *